(12) United States Patent
Diamant et al.

(10) Patent No.: US 11,688,399 B2
(45) Date of Patent: *Jun. 27, 2023

(54) COMPUTERIZED INTELLIGENT ASSISTANT FOR CONFERENCES

(71) Applicant: MICROSOFT TECHNOLOGY LICENSING, LLC, Redmond, WA (US)

(72) Inventors: Adi Diamant, Tel-Aviv (IL); Karen Master Ben-Dor, Kfar-Saba (IL); Eyal Krupka, Redmond, WA (US); Raz Halaly, Ness Ziona (IL); Yoni Smolin, Shimshit (IL); Ilya Gurvich, Haifa (IL); Aviv Hurvitz, Tel-Aviv (IL); Lijuan Qin, Redmond, WA (US); Wei Xiong, Bellevue, WA (US); Shixiong Zhang, Redmond, WA (US); Lingfeng Wu, Bothell, WA (US); Xiong Xiao, Bothell, WA (US); Ido Leichter, Haifa (IL); Moshe David, Bney Braq (IL); Xuedong Huang, Bellevue, WA (US); Amit Kumar Agarwal, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/115,293

(22) Filed: Dec. 8, 2020

(65) Prior Publication Data
US 2021/0210097 A1 Jul. 8, 2021

Related U.S. Application Data

(63) Continuation of application No. 16/024,503, filed on Jun. 29, 2018, now Pat. No. 10,867,610.
(Continued)

(51) Int. Cl.
*H04N 7/14* (2006.01)
*G10L 15/26* (2006.01)
(Continued)

(52) U.S. Cl.
CPC ............ *G10L 15/26* (2013.01); *G06V 40/172* (2022.01); *G10L 17/00* (2013.01); *H04N 7/15* (2013.01)

(58) Field of Classification Search
CPC ... G10L 15/26; G10L 17/005; G06K 9/00288; H04N 7/15; H04M 3/563; H04M 3/56; H04M 3/561; H04M 3/562; G06F 16/685
(Continued)

(56) References Cited

U.S. PATENT DOCUMENTS 7,920,158 B1 * 4/2011 Beck ............... H04M 3/563
348/14.08
9,245,254 B2 1/2016 Lord et al.
(Continued)

FOREIGN PATENT DOCUMENTS

| CN | 103548339 A | 1/2014 |
| CN | 103795964 A | 5/2014 |
| CN | 106685916 A | 5/2017 |

OTHER PUBLICATIONS

"First Office Action and Search Report Issued in Chinese Patent Application No. 201980030272.7", dated Dec. 23, 2021, 17 Pages.
(Continued)

*Primary Examiner* — Md S Elahee
(74) *Attorney, Agent, or Firm* — Shook, Hardy & Bacon L.L.P.

(57) ABSTRACT

A method for facilitating a remote conference includes receiving a digital video and a computer-readable audio signal. A face recognition machine is operated to recognize a face of a first conference participant in the digital video,
(Continued)

and a speech recognition machine is operated to translate the computer-readable audio signal into a first text. An attribution machine attributes the text to the first conference participant. A second computer-readable audio signal is processed similarly, to obtain a second text attributed to a second conference participant. A transcription machine automatically creates a transcript including the first text attributed to the first conference participant and the second text attributed to the second conference participant.

20 Claims, 22 Drawing Sheets

Related U.S. Application Data

(60) Provisional application No. 62/667,368, filed on May 4, 2018.

(51) Int. Cl.
*H04N 7/15* (2006.01)
*G10L 17/00* (2013.01)
*G06V 40/16* (2022.01)

(58) Field of Classification Search
USPC .................................................. 704/200, 235
See application file for complete search history.

(56) References Cited

U.S. PATENT DOCUMENTS

| | | |
|---|---|---|
| 2004/0169683 A1 | 9/2004 | Chiu et al. |
| 2010/0293106 A1 | 11/2010 | Rhoads et al. |
| 2011/0112833 A1* | 5/2011 | Frankel ................ G06F 16/685 704/235 |
| 2011/0261142 A1 | 10/2011 | Shanmukhadas et al. |
| 2015/0339787 A1 | 11/2015 | Evans |
| 2017/0011740 A1 | 1/2017 | Gauci |

OTHER PUBLICATIONS

Junhui, Zhang, "A Kind of Automation Based on Android Mobile Conference System", In Journal of Automation & Instrumentation, vol. 09, Sep. 25, 2016, 3 Pages.

"Office Action Issued in Chinese Patent Application No. 201980030272. 7", dated Jun. 15, 2022, 15 Pages.

"Notice of Allowance Issued in Chinese Patent Application No. 201980030272.7", dated Sep. 14, 2022, 4 Pages.

"Office Action Issued in Indian Patent Application No. 202047048536", dated Aug. 4, 2022, 7 Pages.

* cited by examiner

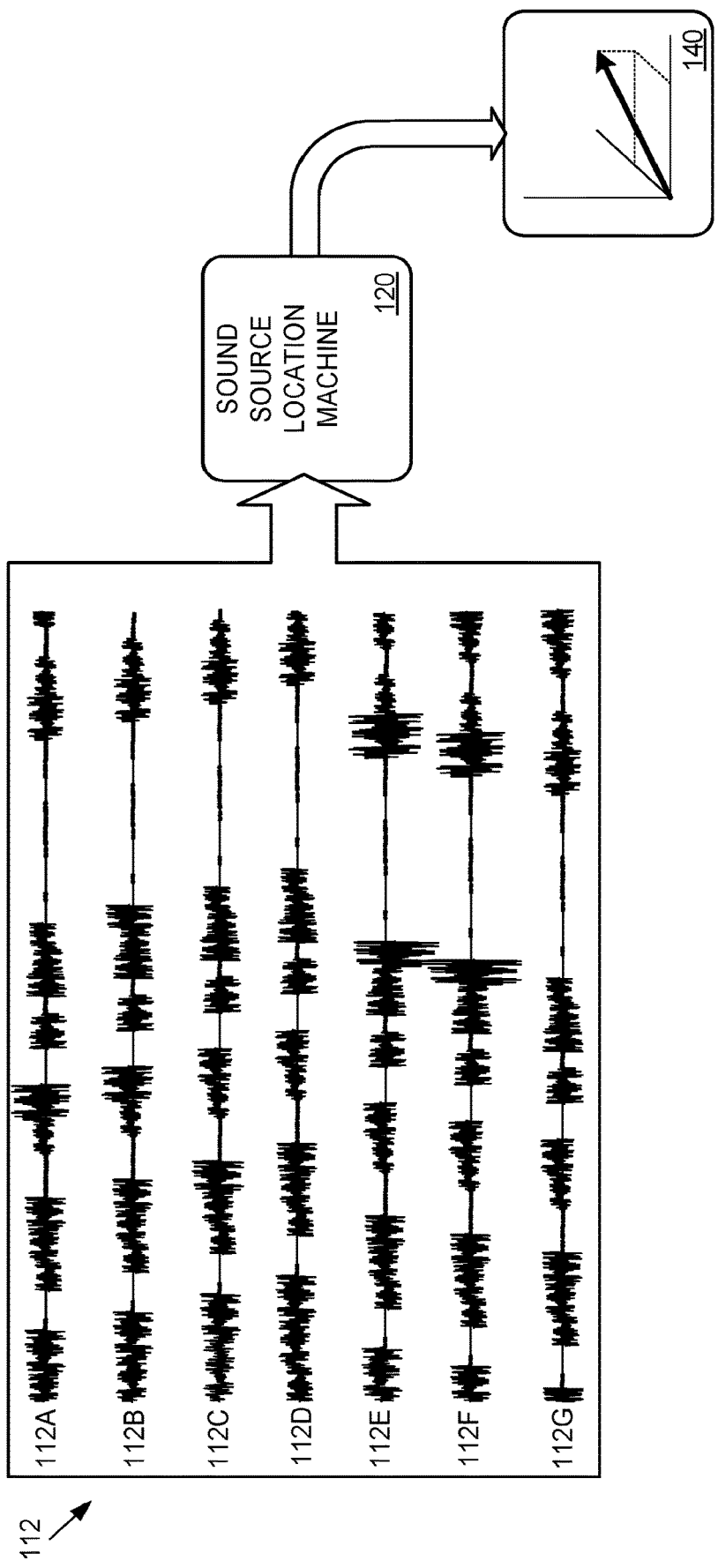

COMPUTERIZED INTELLIGENT ASSISTANT FOR CONFERENCES

CROSS REFERENCE TO RELATED APPLICATIONS

This application is a continuation of U.S. application Ser. No. 16/024,503, filed Jun. 29, 2018, titled "Computerized Intelligent Assistant for Conferences," which claims the benefit of priority to U.S. Provisional Patent Application Ser. No. 62/667,368, filed May 4, 2018, the entirety of which is hereby incorporated herein by reference for all purposes.

BACKGROUND

Individuals and organizations frequently arrange conferences in which a plurality of local and/or remote users participate to share information and to plan and report on tasks and commitments. Such conferences may include sharing information across multiple different modalities, e.g., including spoken and textual conversation, shared visual images, shared digital files, gestures, and non-verbal cues.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for facilitating a remote conference includes receiving a digital video and a computer-readable audio signal. A face recognition machine is operated to recognize a face of a first conference participant in the digital video, and a speech recognition machine is operated to translate the computer-readable audio signal into a first text. An attribution machine attributes the text to the first conference participant. A second computer-readable audio signal is processed similarly, to obtain a second text attributed to a second conference participant. A transcription machine automatically creates a transcript including the first text attributed to the first conference participant and the second text attributed to the second conference participant. Transcription can be extended to a variety of scenarios to coordinate the conference, facilitate communication among conference participants, record events of interest during the conference, track whiteboard drawings and digital files shared during the conference, and more generally create a robust record of multi-modal interactions among conference participants. The conference transcript can be used by participants for reviewing various multi-modal interactions and other events of interest that happened in the conference. The conference transcript can be analyzed to provide conference participants with feedback regarding their own participation in the conference, other participants, and team/organizational trends.

BRIEF DESCRIPTION OF THE DRAWINGS

FIG. 2 schematically shows analysis of sound signals by a sound source localization machine.

DETAILED DESCRIPTION

Figure 1B:
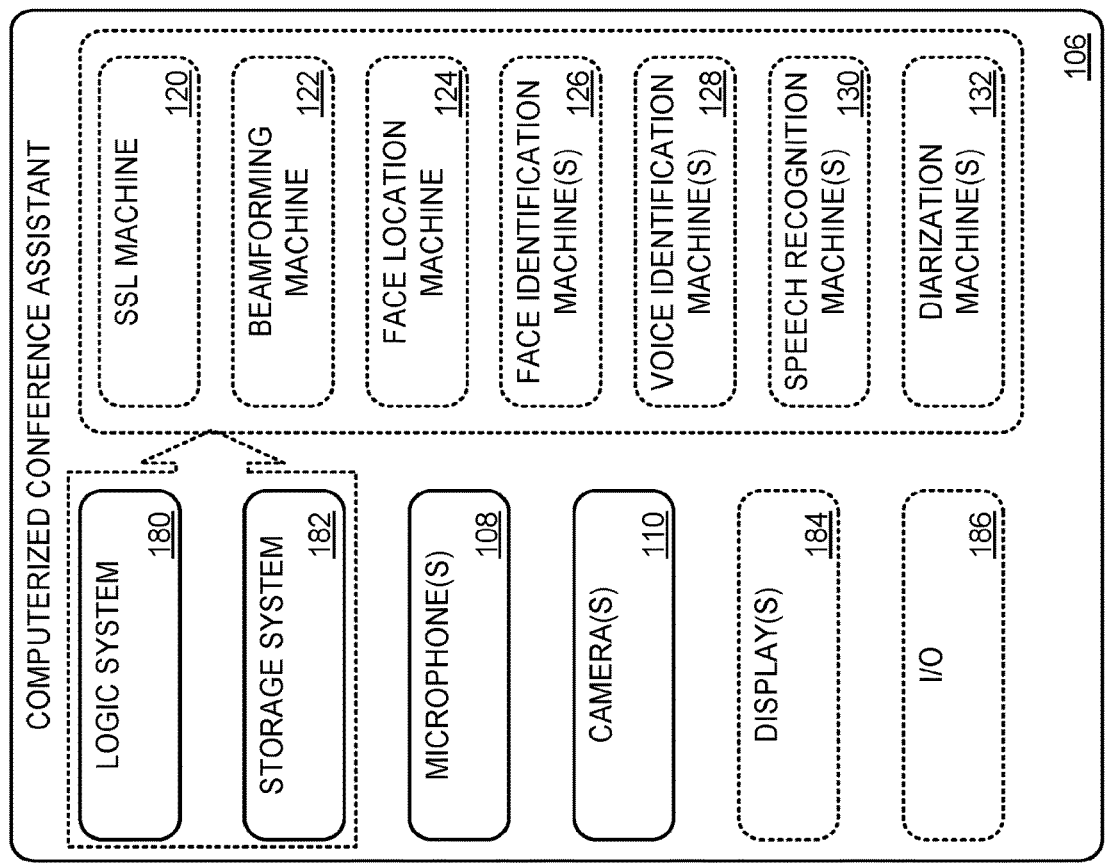
FIG. 1A-1C depict a computing environment including an exemplary computerized conference assistant.

The present disclosure relates generally to providing intelligent assistance to conference participants using a computerized intelligent assistant. The conference participants may include in-person participants who are physically present at a conference location, as well as remote participants who participate via remote audio, video, textual, and/or multi-modal interaction with the in-person participants. In some examples natural language inputs, such as conversation among conference participants, user commands, and other utterances, may be received and processed by the computerized intelligent assistant. Natural language inputs may include speech audio, lexical data (e.g., text), and/or non-verbal cues including hand gestures. In some examples, natural language inputs may be processed as commands by the computerized intelligent assistant, e.g., in order to control recording and/or mediate conversation between local and/or remote participants. As an example, a "cut" hand gesture can be used to stop recording; and a "raise hand" gesture may be used to send a remote participant a notification that a local participant is asking permission to speak. In some examples, data from one or more sensors also may be utilized to process the natural language inputs. In some examples, the computerized intelligent assistant may engage in conversation with conference participants, e.g., to ask disambiguating questions, provide confirmation of a received/processed input, and/or to provide description or directions relating to coordinating the conference. The computerized intelligent assistant may process the natural language data to generate identity, location/position, status/activity, and/or other information related to the conference (e.g., information shared by one or more of the conference participants during the conference, and/or information related to one or more of the conference participants). The conference assistant may coordinate the start and/or end of the conference based on a conference schedule and based on tracking participant arrivals and/or departures. For example, the conference assistant may greet conference participants, inform them as to the conference schedule and/or agenda, etc. The conference assistant can record and/or transcribe various multi-modal interactions between conference participants. For example, the conference assistant can keep track of images shared at a whiteboard and can process the images to show relevant changes to the images while removing occlusion and visual artifacts. The conference assistant can keep track of digital files being shared by the conference participants, including tracking which regions of the files are being edited at particular moments of the conference. More generally, the conference assistant can track events of interest in the conference based on cues such as hand gestures, based on participants' names being mentioned, based on discussion of a topic of interest to one or more participants, or based on artificial intelligence analysis of any of the other various multi-modal interactions between conference participants that are tracked by the conference assistant. The various events of interest can be used as an index in the conference transcript, so that conference participants can readily find relevant portions of the transcript. Accordingly, the conference assistant facilitates reviewing the conference, e.g., after the conference is over, or by a remote conference participant who is unable to attend the conference physically, or by a non-participant who is unable to participate in the conference in real-time.

Furthermore, the conference transcript and other tracked information may be automatically analyzed in order to coordinate the conference, by providing a transcript of the conference to conference participants for subsequent review, tracking arrivals and departures of conference participants, providing cues to conference participants during the conference, and/or analyzing the information in order to summarize one or more aspects of the conference for subsequent review.

FIG. 1 shows an example conference environment 100 including three conference participants 102A, 102B, and 102C meeting around a table 104. A computerized conference assistant 106 is on table 104 ready to facilitate a meeting between the conference participants. Computerized conference assistants consistent with this disclosure may be configured with a myriad of features designed to facilitate productive meetings. While the following description uses computerized conference assistant 106 as an example computer, other computers or combinations of computers may be configured to utilize the techniques described below. As such, the present disclosure is in no way limited to computerized conference assistant 106.

FIG. 1B schematically shows relevant aspects of computerized conference assistant 106, each of which is discussed below. Of particular relevance, computerized conference assistant 106 includes microphone(s) 108 and camera(s) 110.

Figure 1A:
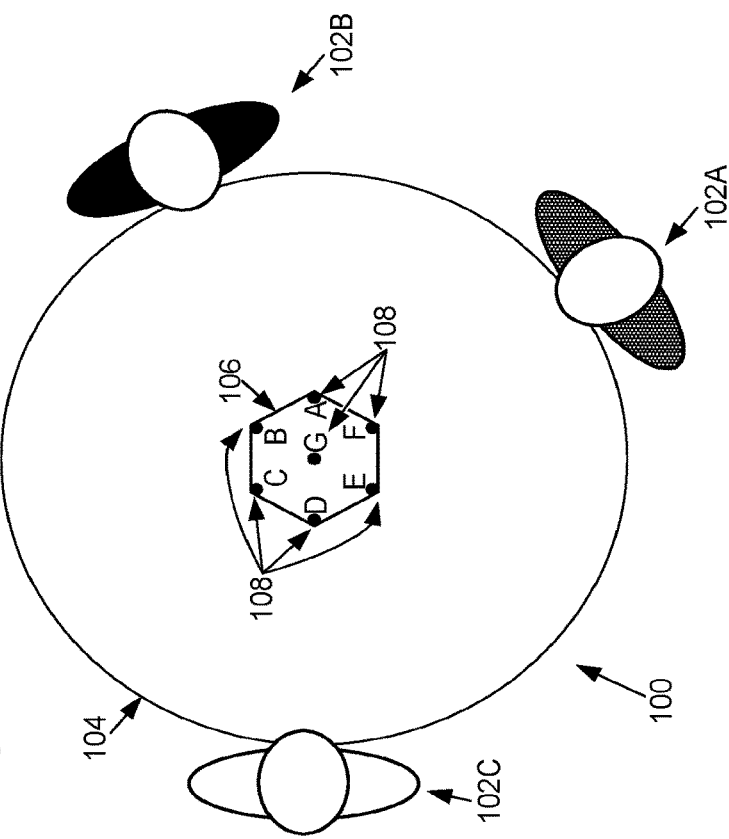
Figure 1C:
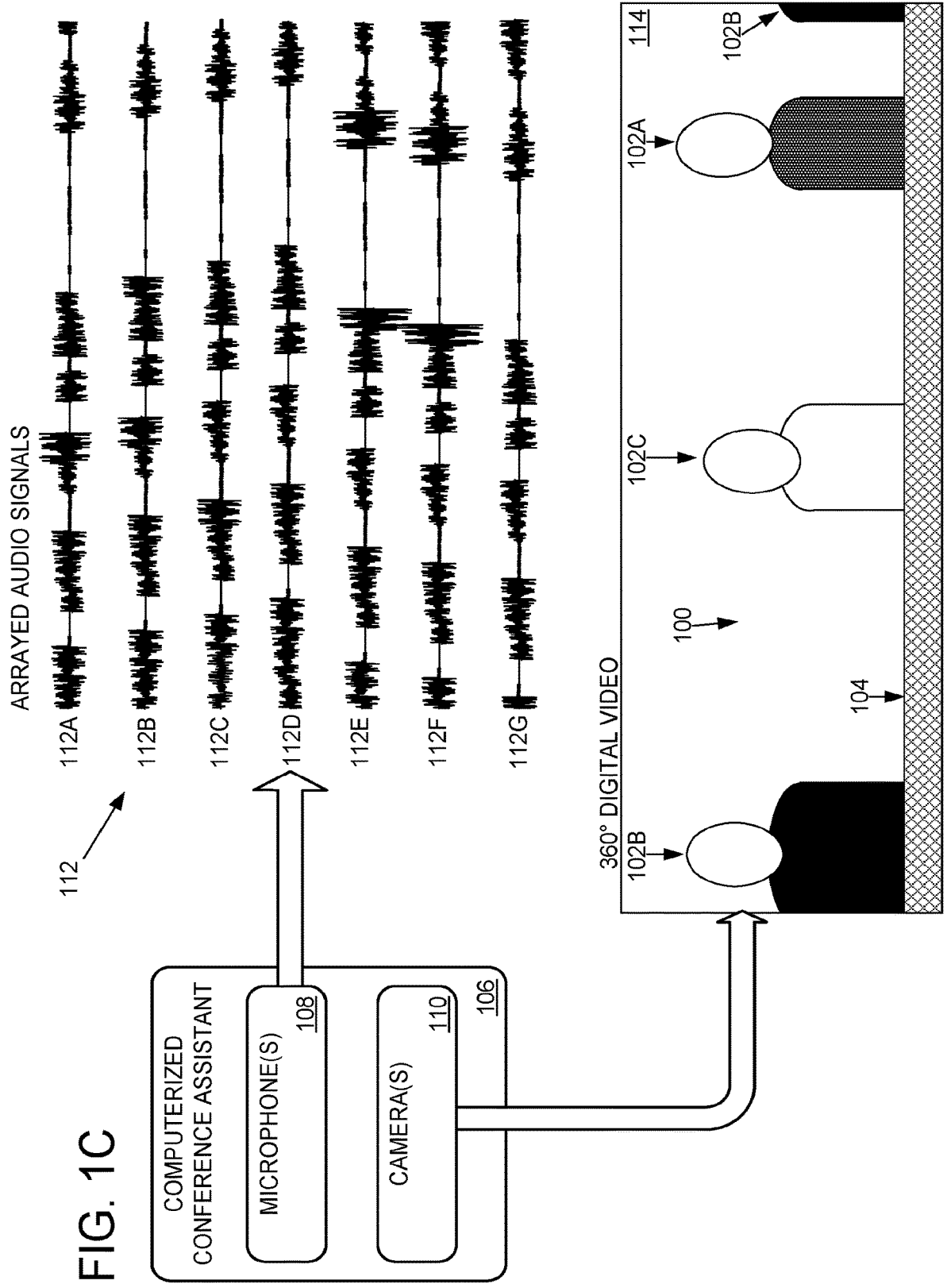

As shown in FIG. 1A, the computerized conference assistant 106 includes an array of seven microphones 108A, 108B, 108C, 108D, 108E, 108F, and 108G. As shown in FIG. 1C, these microphones 108 are configured to directionally record sound and convert the audible sound into a computer-readable audio signal 112 (i.e., signals 112a, 112b, 112c, 112d, 112e, 112f, and 112g respectively). "Computer-readable signal" and "computer-readable audio signal" may refer herein to any audio signal which is suitable for further processing by one or more computing devices, e.g., analog and/or digital electrical signals. Accordingly, an analog to digital converter and optional digital encoders may be used to convert the sound into the computer-readable audio signals. In some examples, a computer-readable signal may be divided into a plurality of portions for subsequent processing, e.g., by selecting a particular duration and/or temporal portion of the signal, by selecting particular channels of the signal (e.g., left or right channel, or a particular microphone of a microphone array), by selecting particular frequencies of the signal (e.g., low-pass, high-pass, or band-pass filter), and/or by selecting particular spatial components of the signal, such as by beamforming the signal as described herein. Microphones 108A-F are equally spaced around the computerized conference assistant 106 and aimed to directionally record sound originating in front of the microphone. Microphone 108g is positioned between the other microphones and aimed upward.

In some implementations, computerized conference assistant 106 includes a 360° camera configured to convert light of one or more electromagnetic bands (e.g., visible, infrared, and/or near infrared) into a 360° digital video 114 or other suitable visible, infrared, near infrared, spectral, and/or depth digital video. In some implementations, the 360° camera may include fisheye optics that redirect light from all azimuthal angles around the computerized conference assistant 106 to a single matrix of light sensors, and logic for mapping the independent measurements from the sensors to a corresponding matrix of pixels in the 360° digital video 114. In some implementations, two or more cooperating cameras may take overlapping sub-images that are stitched together into digital video 114. In some implementations, camera(s) 110 have a collective field of view of less than 3600 and/or two or more originating perspectives (e.g., cameras pointing toward a center of the room from the four corners of the room). 360° digital video 114 is shown as being substantially rectangular without appreciable geometric distortion, although this is in no way required.

Returning briefly to FIG. 1B, computerized conference assistant 106 includes a sound source localization (SSL) machine 120 that is configured to estimate the location(s) of sound(s) based on signals 112. FIG. 2 schematically shows SSL machine 120 analyzing signals 112a-g to output an estimated origination 140 of the sound modeled by signals 112a-g. As introduced above, signals 112a-g are respectively generated by microphones 108a-g. Each microphone has a different physical position and/or is aimed in a different direction. Microphones that are farther from a sound source and/or aimed away from a sound source will generate a relatively lower amplitude and/or slightly phase delayed signal 112 relative to microphones that are closer to and/or aimed toward the sound source. As an example, while microphones 108a and 108d may respectively produce signals 112a and 112d in response to the same sound, signal 112a may have a measurably greater amplitude if the recorded sound originated in front of microphone 108a. Similarly, signal 112d may be phase shifted behind signal 112a due to the longer time of flight (ToF) of the sound to microphone 108d. SSL machine 120 may use the amplitude, phase difference, and/or other parameters of the signals 112a-g to estimate the origination 140 of a sound. SSL machine 120 may be configured to implement any suitable two- or three-dimensional location algorithms, including but not limited to previously-trained artificial neural networks, maximum likelihood algorithms, multiple signal classification algorithms, and cross-power spectrum phase analysis algorithms. Depending on the algorithm(s) used in a particular application, the SSL machine 120 may output an angle, vector, coordinate, and/or other parameter estimating the origination 140 of a sound.

Figure 3:
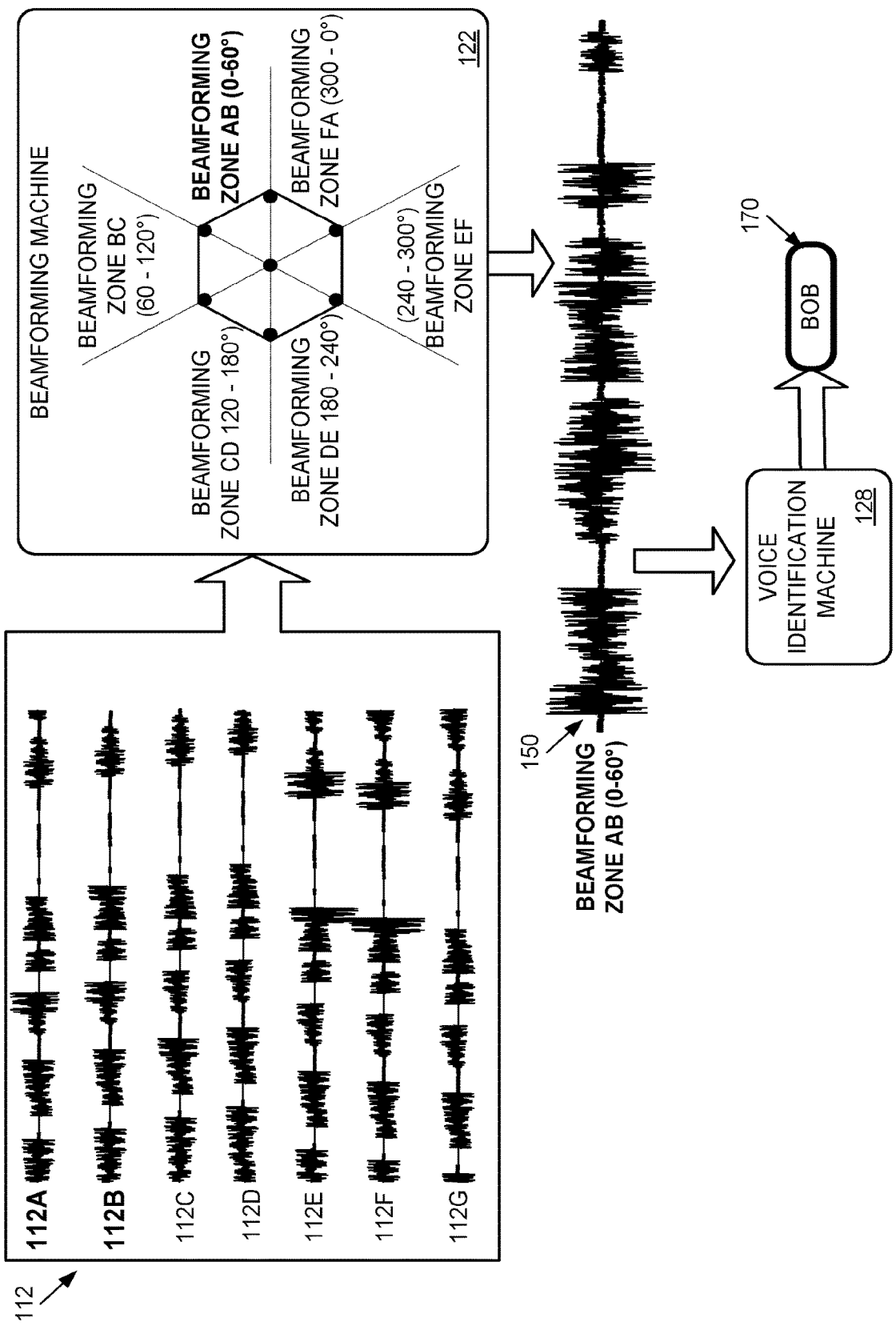
FIG. 3 schematically shows beamforming of sound signals by a beamforming machine.

As shown in FIG. 1B, computerized conference assistant 106 also includes a beamforming machine 122. The beamforming machine 122 may be configured to isolate sounds originating in a particular zone (e.g., a 0-60° arc) from sounds originating in other zones. In the embodiment depicted in FIG. 3, beamforming machine 122 is configured to isolate sounds in any of six equally-sized static zones. In other implementations, there may be more or fewer static zones, dynamically sized zones (e.g., a focused 15° arc), and/or dynamically aimed zones (e.g., a 60° zone centered at 9°). Any suitable beamforming signal processing may be utilized to subtract sounds originating outside of a selected zone from a resulting beamformed signal 150. In implementations that utilize dynamic beamforming, the location of the various speakers may be used as criteria for selecting the number, size, and centering of the various beamforming zones. As one example, the number of zones may be selected to equal the number of speakers, and each zone may be centered on the location of the speaker (e.g., as determined via face identification and/or sound source localization). In some implementations beamforming machine may be configured to independently and simultaneously listen to two or more different zones, and output two or more different beamformed signals in parallel. As such, two or more overlapping/interrupting speakers may be independently processed.

Figure 4:
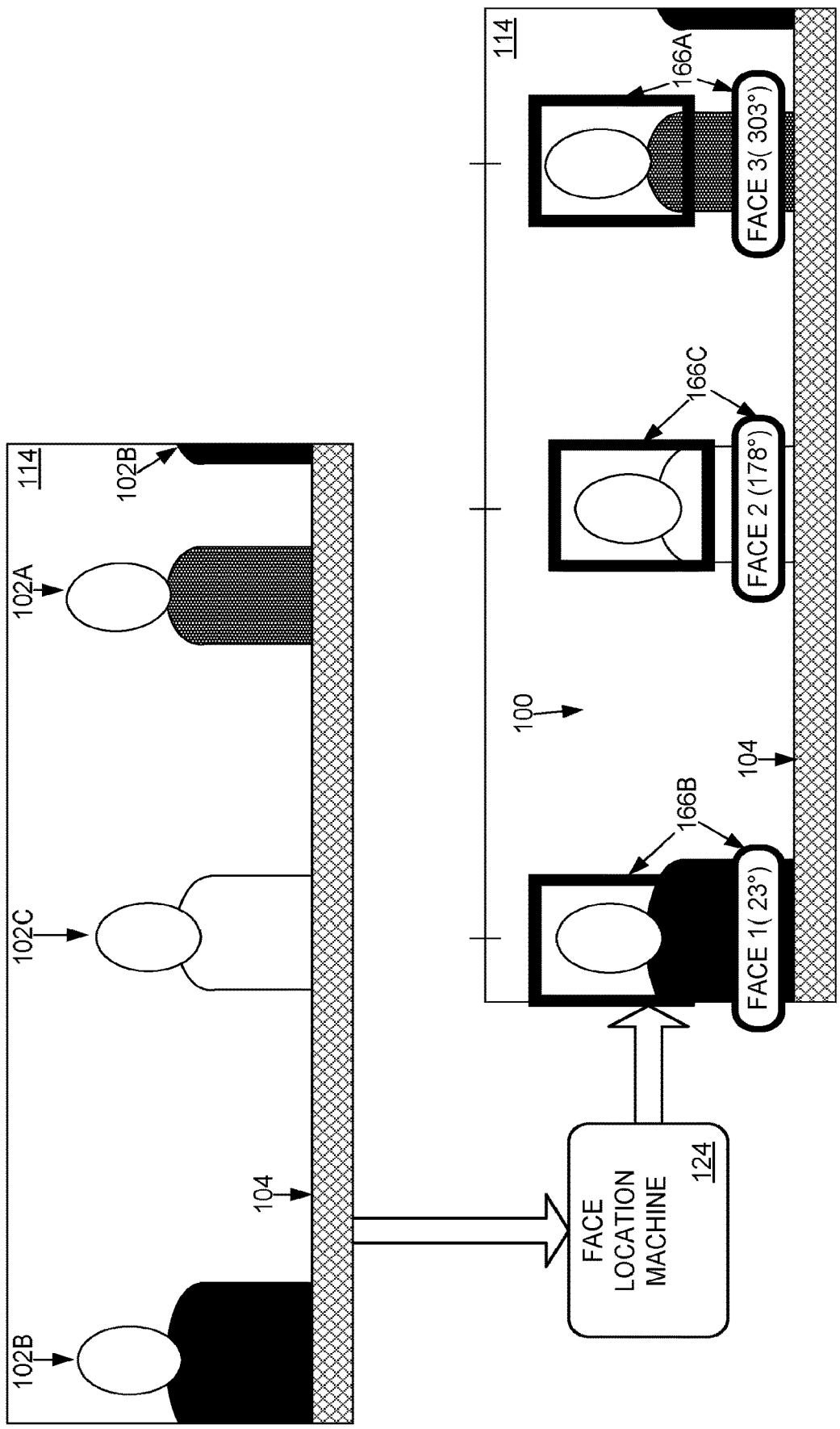
FIG. 4 schematically shows detection of human faces by a face detection machine.

As shown in FIG. 1B, computerized conference assistant 106 includes a face location machine 124 and a face identification machine 126. As shown in FIG. 4, face location machine 124 is configured to find candidate faces 166 in digital video 114. As an example, FIG. 4 shows face location machine 124 finding candidate FACE(1) at 23°, candidate FACE(2) at 178', and candidate FACE(3) at 303°. The candidate faces 166 output by the face location machine 124 may include coordinates of a bounding box around a located face image, a portion of the digital image where the face was located, other location information (e.g., 23°), and/or labels (e.g., "FACE(1)").

Figure 5:
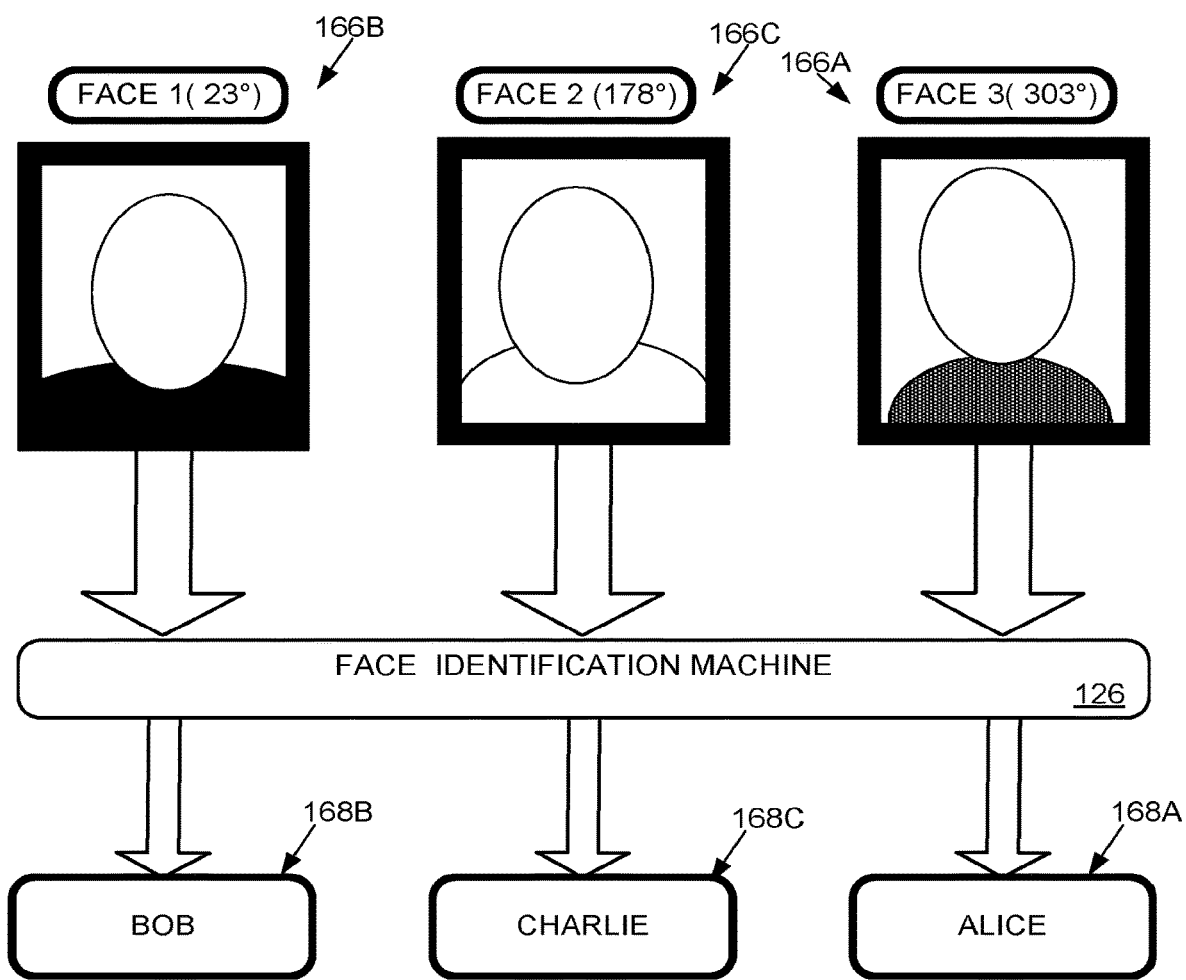
FIG. 5 schematically shows identification of human faces by a face identification machine.

Face identification machine 126 optionally may be configured to determine an identity 168 of each candidate face 166 by analyzing just the portions of the digital video 114 where candidate faces 166 have been found. In other implementations, the face location step may be omitted, and the face identification machine may analyze a larger portion of the digital video 114 to identify faces. FIG. 5 shows an example in which face identification machine 126 identifies candidate FACE(1) as "Bob," candidate FACE(2) as "Charlie," and candidate FACE(3) as "Alice." While not shown, each identity 168 may have an associated confidence value, and two or more different identities 168 having different confidence values may be found for the same face (e.g., Bob(88%), Bert (33%)). If an identity with at least a threshold confidence cannot be found, the face may remain unidentified and/or may be given a generic unique identity 168 (e.g., "Guest(42)"). Speech may be attributed to such generic unique identities.

When used, face location machine 124 may employ any suitable combination of state-of-the-art and/or future machine learning (ML) and/or artificial intelligence (AI) techniques. Non-limiting examples of techniques that may be incorporated in an implementation of face location machine 124 include support vector machines, multi-layer neural networks, convolutional neural networks (e.g., including spatial convolutional networks for processing images and/or videos), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, the methods and processes utilized by face location machine 124 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the face location machine 124.

Non-limiting examples of training procedures for face location machine 124 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of components of face location machine 124 may be trained simultaneously with regard to an objective function measuring performance of collective functioning of the plurality of components (e.g., with regard to reinforcement feedback and/or with regard to labelled training data), in order to improve such collective functioning. In some examples, one or more components of face location machine 124 may be trained independently of other components (e.g., offline training on historical data). For example, face location machine 124 may be trained via supervised training on labelled training data comprising images with labels indicating any face(s) present within such images, and with regard to an objective function measuring an accuracy, precision, and/or recall of locating faces by face location machine 124 as compared to actual locations of faces indicated in the labelled training data.

In some examples, face location machine 124 may employ a convolutional neural network configured to convolve inputs with one or more predefined, randomized and/or learned convolutional kernels. By convolving the convolutional kernels with an input vector (e.g., representing digital video 114), the convolutional neural network may detect a feature associated with the convolutional kernel. For example, a convolutional kernel may be convolved with an input image to detect low-level visual features such as lines, edges, corners, etc., based on various convolution operations with a plurality of different convolutional kernels. Convolved outputs of the various convolution operations may be processed by a pooling layer (e.g., max pooling) which may detect one or more most salient features of the input image and/or aggregate salient features of the input image, in order to detect salient features of the input image at particular locations in the input image. Pooled outputs of the pooling layer may be further processed by further convolutional layers. Convolutional kernels of further convolutional layers may recognize higher-level visual features, e.g., shapes and patterns, and more generally spatial arrangements of lower-level visual features. Some layers of the convolutional neural network may accordingly recognize and/or locate visual features of faces (e.g., noses, eyes, lips). Accordingly, the convolutional neural network may recognize and locate faces in the input image. Although the foregoing example is described with regard to a convolutional neural network, other neural network techniques may be able to detect and/or locate faces and other salient features based on detecting low-level visual features, higher-level visual features, and spatial arrangements of visual features.

Face identification machine 126 may employ any suitable combination of state-of-the-art and/or future ML and/or AI techniques. Non-limiting examples of techniques that may be incorporated in an implementation of face identification machine 126 include support vector machines, multi-layer neural networks, convolutional neural networks, recurrent neural networks, associative memories, unsupervised spatial and/or clustering methods, and/or graphical models.

In some examples, face identification machine 126 may be implemented using one or more differentiable functions and at least partially determined by a set of trainable parameters. Accordingly, the trainable parameters may be adjusted through any suitable training procedure, in order to continually improve functioning of the face identification machine 126.

Non-limiting examples of training procedures for face identification machine 126 include supervised training, zero-shot, few-shot, unsupervised learning methods, reinforcement learning and/or generative adversarial neural network training methods. In some examples, a plurality of components of face identification machine 126 may be trained simultaneously with regard to an objective function measuring performance of collective functioning of the plurality of components in order to improve such collective functioning. In some examples, one or more components of face identification machine 126 may be trained independently of other components.

In some examples, face identification machine 126 may employ a convolutional neural network configured to detect and/or locate salient features of input images. In some examples, face identification machine 126 may be trained via supervised training on labelled training data comprising images with labels indicating a specific identity of any face(s) present within such images, and with regard to an objective function measuring an accuracy, precision, and/or recall of identifying faces by face identification machine 126 as compared to actual identities of faces indicated in the labelled training data. In some examples, face identification machine 126 may be trained via supervised training on labelled training data comprising pairs of face images with labels indicating whether the two face images in a pair are images of a single individual or images of two different individuals, and with regard to an objective function measuring an accuracy, precision, and/or recall of distinguishing single-individual pairs from two-different-individual pairs.

In some examples, face identification machine 126 may be configured to classify faces by selecting and/or outputting a confidence value for an identity from a predefined selection of identities, e.g., a predefined selection of identities for whom face images were available in training data used to train face identification machine 126. In some examples, face identification machine 126 may be configured to assess a feature vector representing a face, e.g., based on an output of a hidden layer of a neural network employed in face identification machine 126. Feature vectors assessed by face identification machine 126 for a face image may represent an embedding of the face image in a representation space learned by face identification machine 126. Accordingly, feature vectors may represent salient features of faces based on such embedding in the representation space.

In some examples, face identification machine 126 may be configured to enroll one or more individuals for later identification. Enrollment by face identification machine 126 may include assessing a feature vector representing the individual's face, e.g., based on one or more images and/or video of the individual's face. In some examples, identification of an individual based on a test image may be based on a comparison of a test feature vector assessed by face identification machine 126 for the test image, to a previously-assessed feature vector from when the individual was enrolled for later identification. Comparing a test feature vector to a feature vector from enrollment may be performed in any suitable fashion, e.g., using a measure of similarity such as cosine or inner product similarity, and/or by unsupervised spatial and/or clustering methods (e.g., approximative k-nearest neighbor methods). Comparing the test feature vector to the feature vector from enrollment may be suitable for assessing identity of individuals represented by the two vectors, e.g., based on comparing salient features of faces represented by the vectors.

As shown in FIG. 1B, computerized conference assistant 106 includes a voice identification machine 128. The voice identification machine 128 is analogous to the face identification machine 126 because it also attempts to identify an individual. However, unlike the face identification machine 126, which is trained on and operates on video images, the voice identification machine is trained on and operates on audio signals, such as beamformed signal 150 and/or signal(s) 112. The ML and AI techniques described above may be used by voice identification machine 128. The voice identification machine outputs voice IDs 170, optionally with corresponding confidences (e.g., Bob (77%)).

Figure 6:
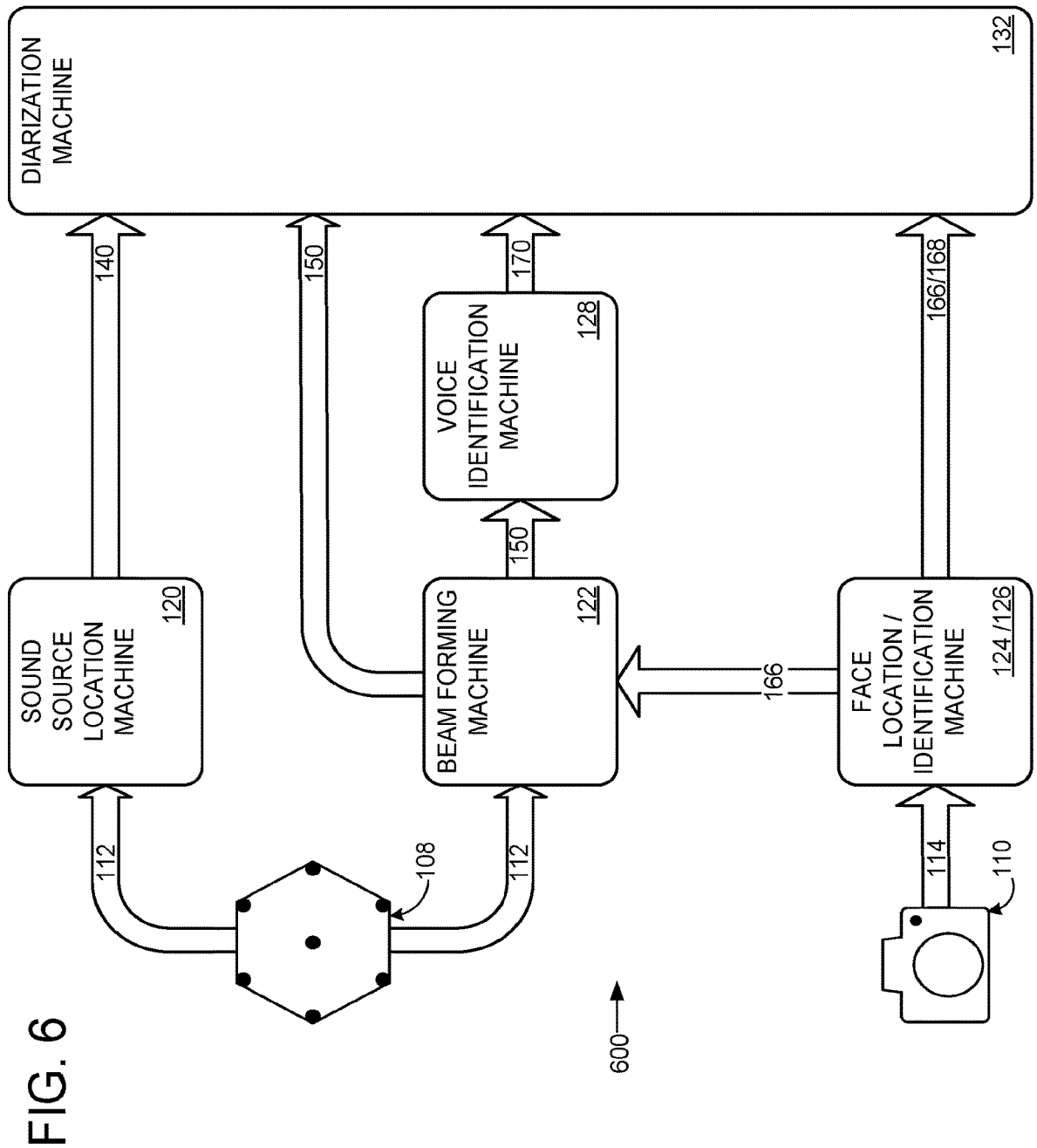
FIG. 6 schematically shows an exemplary diarization framework.

FIG. 6 schematically shows an example diarization framework 600 for the above-discussed components of computerized conference assistant 106. While diarization framework 600 is described below with reference to computerized conference assistant 106, the diarization framework may be implemented using different hardware, firmware, and/or software components (e.g., different microphone and/or camera placements and/or configurations). Furthermore, SSL machine 120, beamforming machine 122, face location machine 124, and/or face identification machine 128 may be used in different sensor fusion frameworks designed to associate speech utterances with the correct speaker.

In the illustrated implementation, microphones 108 provide signals 112 to SSL machine 120 and beamforming machine 122, and the SLL machine outputs origination 140 to diarization machine 132. In some implementations, origination 140 optionally may be output to Beamforming machine 122. Camera 110 provides 360° digital videos 114 to face location machine 124 and face identification machine 126. The face location machine passes the locations of candidate faces 166 (e.g., 23°) to the beamforming machine 122, which the beamforming machine may utilize to select a desired zone where a speaker has been identified. The beamforming machine 122 passes beamformed signal 150 to diarization machine 132 and to voice identification machine 128, which passes voice ID 170 to the diarization machine 132. Face identification machine 128 outputs identities 168

(e.g., "Bob") with corresponding locations of candidate faces (e.g., 23°) to the diarization machine. While not shown, the diarization machine may receive other information and use such information to attribute speech utterances with the correct speaker.

Diarization machine 132 is a sensor fusion machine configured to use the various received signals to associate recorded speech with the appropriate speaker. The diarization machine is configured to attribute information encoded in the beamformed signal or another audio signal to the human responsible for generating the corresponding sounds/ speech. In some implementations (e.g., FIG. 11), the diarization machine is configured to attribute the actual audio signal to the corresponding speaker (e.g., label the audio signal with the speaker identity). In some implementations (e.g., FIG. 12), the diarization machine is configured to attribute speech-recognized text to the corresponding speaker (e.g., label the text with the speaker identity).

In one nonlimiting example, the following algorithm may be employed:
Video input (e.g., 360° digital video 114) from start to time t is denoted as $V_{1:t}$
Audio input from N microphones (e.g., signals 112) is denoted as $A_{1:t}^{[1:N]}$
Diarization machine 132 solves WHO is speaking, at WHERE and WHEN, by maximizing the following:

$$\max_{who, angle} P(who, angle \mid A_{1:t}^{[1:N]}, V_{1:t})$$

Where $P(who, angle \mid A_{1:t}^{[1:N]}, V_{1:t})$ is computed by $P(who \mid A_{1:t}^{[1:N]}, angle) \times P(angle \mid A_{1:t}^{[1:N]}) \times P(who, angle \mid V_{1:t})$
Where $P(who \mid A_{1:t}^{[1:N]}, angle)$ is the Voice ID 170, which takes N channel inputs and selects one beamformed signal 150 according to the angle of candidate face 166;
$P(angle \mid A_{1:t}^{[1:N]})$ is the origination 140, which takes N channel inputs and predicts which angle most likely has sound;
$P(who, angle \mid V_{1:t})$ is the identity 168, which takes the video 114 as input and predicts the probability of each face showing up at each angle.

The above framework may be adapted to use any suitable processing strategies, including but not limited to the ML/AI techniques discussed above. Using the above framework, the probability of one face at the found angle is usually dominative, e.g., probability of Bob's face at 23° is 99%, and the probabilities of his face at all the other angles is almost 0%.

Figure 7:
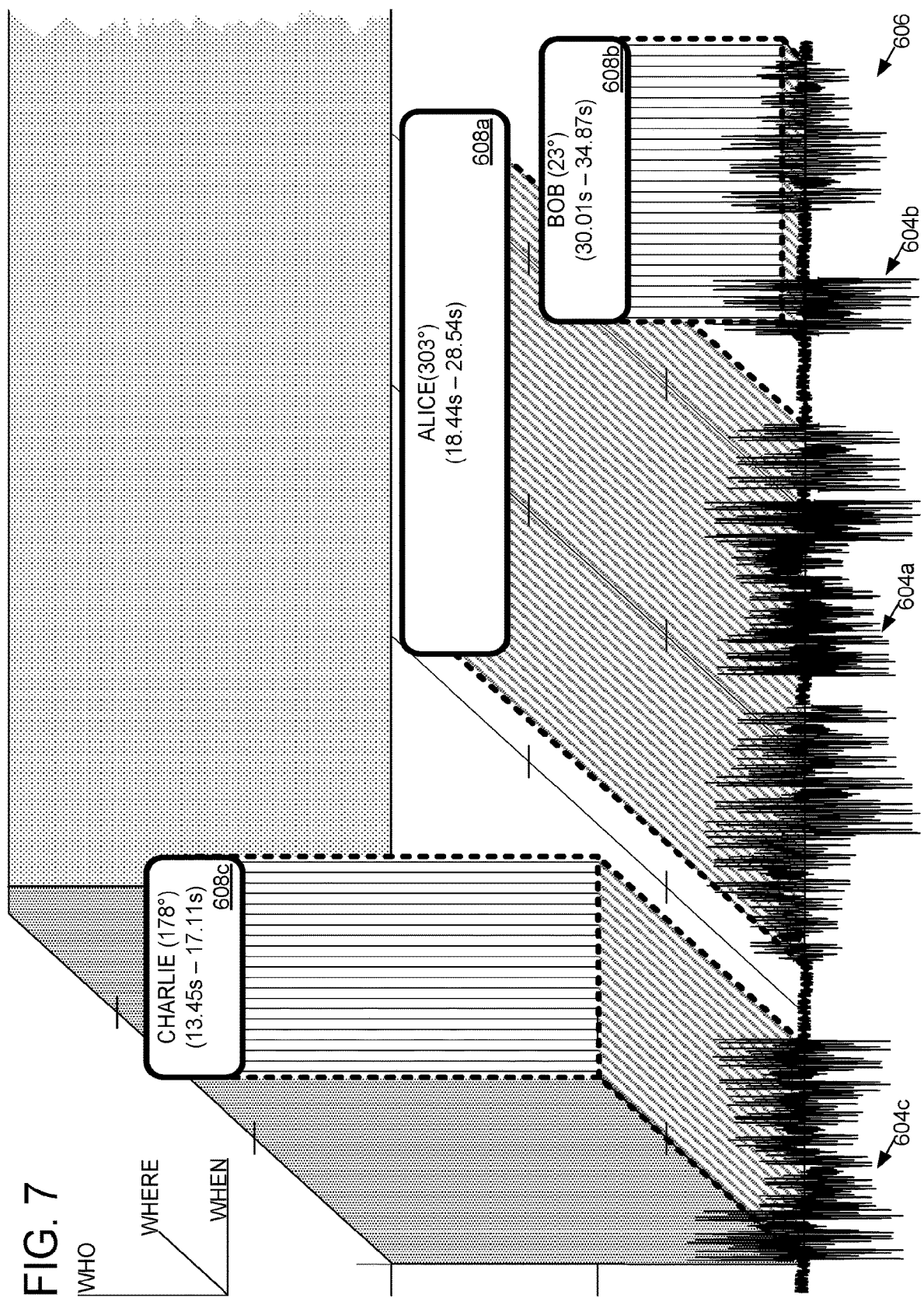
FIG. 7 is a visual representation of an example output of a diarization machine.

FIG. 7 is a visual representation of an example output of diarization machine 132. In FIG. 6, a vertical axis is used to denote WHO (e.g., Bob) is speaking; the horizontal axis denotes WHEN (e.g., 30.01 s-34.87 s) that speaker is speaking; and the depth axis denotes from WHERE (e.g., 23°) that speaker is speaking Diarization machine 132 may use this WHO/WHEN/WHERE information to label corresponding segments 604 of the audio signal(s) 606 under analysis with labels 608. The segments 604 and/or corresponding labels may be output from the diarization machine 132 in any suitable format. The output effectively associates speech with a particular speaker during a conversation among N speakers, and allows the audio signal corresponding to each speech utterance (with WHO/WHEN/WHERE labeling/metadata) to be used for myriad downstream operations. One nonlimiting downstream operation is conversation transcription, as discussed in more detail below. As another example, accurately attributing speech utterances with the correct speaker can be used by an AI assistant to identify who is talking, thus decreasing a necessity for speakers to address an AI assistant with a keyword (e.g., "Cortana").

Figure 8:
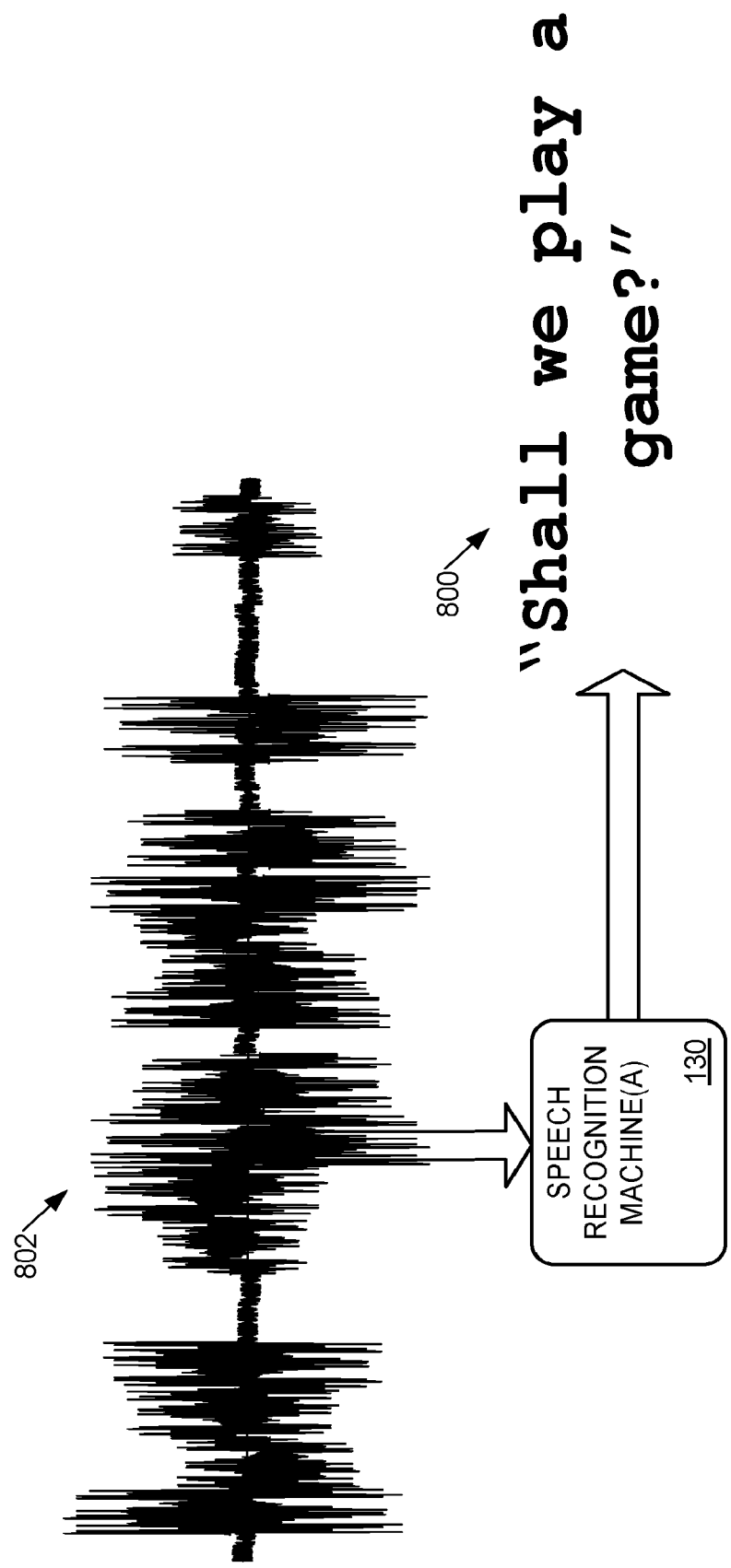
FIG. 8 schematically shows recognition of an utterance by a speech recognition machine.

Returning briefly to FIG. 1B, computerized conference assistant 106 may include a speech recognition machine 130. As shown in FIG. 8, the speech recognition machine 130 may be configured to translate an audio signal of recorded speech (e.g., signals 112, beamformed signal 150, signal 606, and/or segments 604) into text 800. In the scenario illustrated in FIG. 8, speech recognition machine 130 translates signal 802 into the text: "Shall we play a game?"

Speech recognition machine 130 may employ any suitable combination of state-of-the-art and/or future natural language processing (NLP), AI, and/or ML techniques. Non-limiting examples of techniques that may be incorporated in an implementation of speech recognition machine 130 include support vector machines, multi-layer neural networks, convolutional neural networks (e.g., including temporal convolutional neural networks for processing natural language sentences), word embedding models (e.g., GloVe or Word2Vec), recurrent neural networks, associative memories, unsupervised spatial and/or clustering methods, graphical models, and/or natural language processing techniques (e.g., tokenization, stemming, constituency and/or dependency parsing, and/or intent recognition).

In some examples, speech recognition machine 130 may be implemented using one or more differentiable functions and at least partially determined by a set of trainable parameters. Accordingly, the trainable parameters may be adjusted through any suitable training procedure, in order to continually improve functioning of the speech recognition machine 130.

Non-limiting examples of training procedures for speech recognition machine 130 include supervised training, zero-shot, few-shot, unsupervised learning methods, reinforcement learning and/or generative adversarial neural network training methods. In some examples, a plurality of components of speech recognition machine 130 may be trained simultaneously with regard to an objective function measuring performance of collective functioning of the plurality of components in order to improve such collective functioning. In some examples, one or more components of speech recognition machine 130 may be trained independently of other components. In an example, speech recognition machine 130 may be trained via supervised training on labelled training data comprising speech audio annotated to indicate actual lexical data (e.g., words, phrases, and/or any other language data in textual form) corresponding to the speech audio, with regard to an objective function measuring an accuracy, precision, and/or recall of correctly recognizing lexical data corresponding to speech audio.

In some examples, speech recognition machine 130 may use an AI and/or ML model (e.g., an LSTM and/or a temporal convolutional neural network) to represent speech audio in a computer-readable format. In some examples, speech recognition machine 130 may represent speech audio input as word embedding vectors in a learned representation space shared by a speech audio model and a word embedding model (e.g., a latent representation space for GloVe vectors, and/or a latent representation space for Word2Vec vectors). Accordingly, by representing speech audio inputs and words in the learned representation space, speech recognition machine 130 may compare vectors representing speech audio to vectors representing words, to assess, for a speech audio input, a closest word embedding vector (e.g., based on cosine similarity and/or approximative k-nearest neighbor methods or any other suitable comparison method).

In some examples, speech recognition machine 130 may be configured to segment speech audio into words (e.g., using LSTM trained to recognize word boundaries, and/or separating words based on silences or amplitude differences between adjacent words). In some examples, speech recognition machine 130 may classify individual words to assess lexical data for each individual word (e.g., character sequences, word sequences, n-grams). In some examples, speech recognition machine 130 may employ dependency and/or constituency parsing to derive a parse tree for lexical data. In some examples, speech recognition machine 130 may operate AI and/or ML models (e.g., LSTM) to translate speech audio and/or vectors representing speech audio in the learned representation space, into lexical data, wherein translating a word in the sequence is based on the speech audio at a current time and further based on an internal state of the AI and/or ML models representing previous words from previous times in the sequence. Translating a word from speech audio to lexical data in this fashion may capture relationships between words that are potentially informative for speech recognition, e.g., recognizing a potentially ambiguous word based on a context of previous words, and/or recognizing a mispronounced word based on a context of previous words. Accordingly, speech recognition machine 130 may be able to robustly recognize speech, even when such speech may include ambiguities, mispronunciations, etc.

Speech recognition machine 130 may be trained with regard to an individual, a plurality of individuals, and/or a population. Training speech recognition machine 130 with regard to a population of individuals may cause speech recognition machine 130 to robustly recognize speech by members of the population, taking into account possible distinct characteristics of speech that may occur more frequently within the population (e.g., different languages of speech, speaking accents, vocabulary, and/or any other distinctive characteristics of speech that may vary between members of populations). Training speech recognition machine 130 with regard to an individual and/or with regard to a plurality of individuals may further tune recognition of speech to take into account further differences in speech characteristics of the individual and/or plurality of individuals. In some examples, different speech recognition machines (e.g., a speech recognition machine (A) and a speech recognition (B)) may be trained with regard to different populations of individuals, thereby causing each different speech recognition machine to robustly recognize speech by members of different populations, taking into account speech characteristics that may differ between the different populations.

Figure 9:
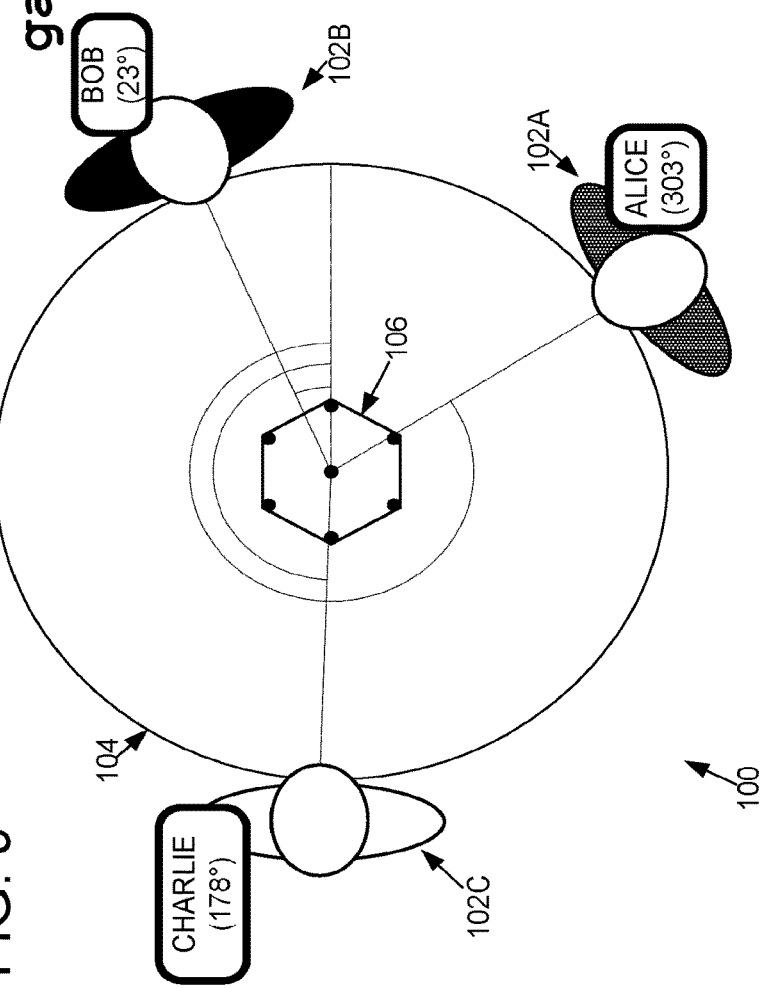
FIG. 9 shows an example of diarization by a computerized conference assistant.

Labeled and/or partially labelled audio segments may be used to not only determine which of a plurality of N speakers is responsible for an utterance, but also translate the utterance into a textural representation for downstream operations, such as transcription. FIG. 9 shows a nonlimiting example in which the computerized conference assistant 106 uses microphones 108 and camera 110 to determine that a particular stream of sounds is a speech utterance from Bob, who is sitting at 23° around the table 104 and saying: "Shall we play a game?" The identities and positions of Charlie and Alice are also resolved, so that speech utterances from those speakers may be similarly attributed and translated into text.

Figure 10:
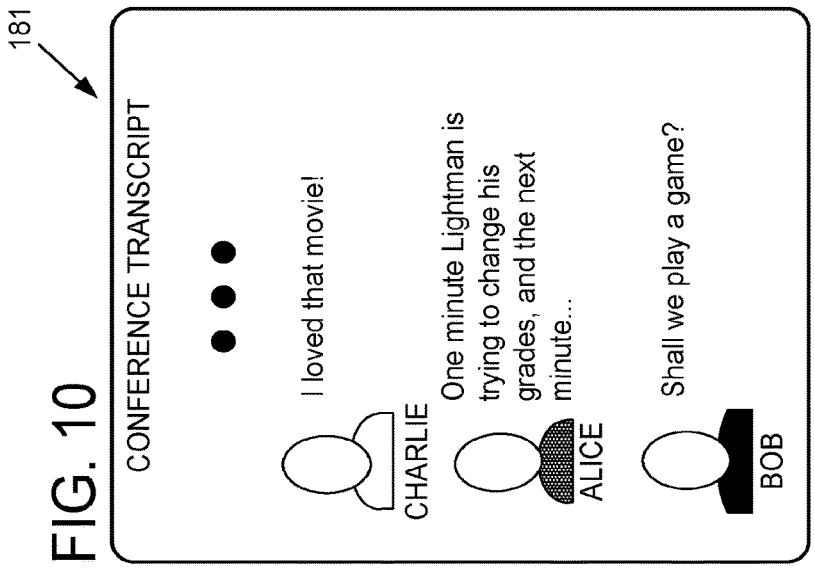
FIG. 10 shows an example conference transcript.

FIG. 10 shows an example conference transcript 181, which includes text attributed, in chronological order, to the correct speakers. Transcriptions optionally may include other information, like the times of each speech utterance and/or the position of the speaker of each utterance. In scenarios in which speakers of different languages are participating in a conference, the text may be translated into a different language. For example, each reader of the transcript may be presented a version of the transcript with all text in that reader's preferred language, even if one or more of the speakers originally spoke in different languages. Transcripts generated according to this disclosure may be updated in real time, such that new text can be added to the transcript with the proper speaker attribution responsive to each new utterance.

Figure 11:
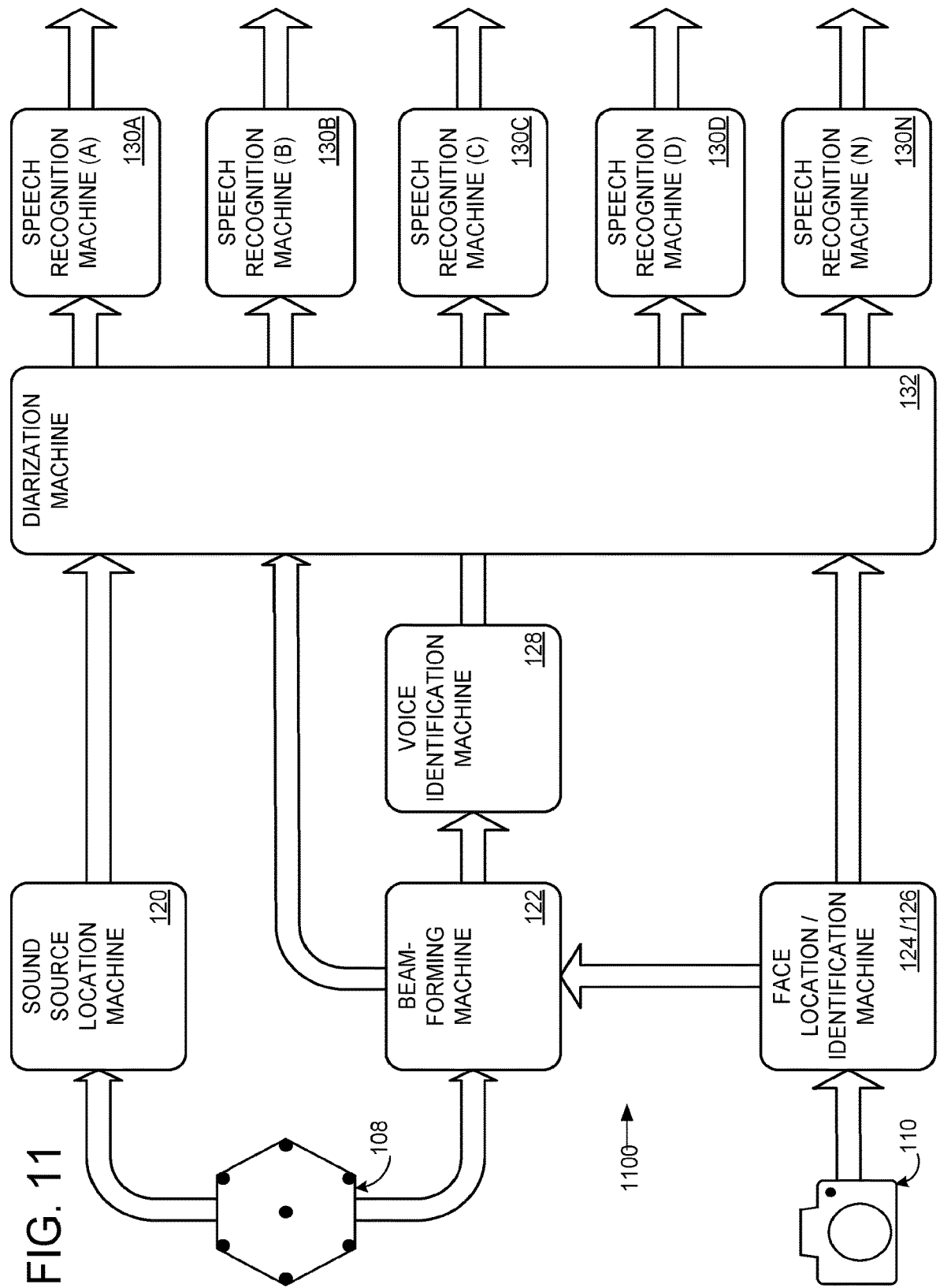
FIG. 11 schematically shows an exemplary diarization framework in which speech recognition machines are downstream from a diarization machine.

FIG. 11 shows a nonlimiting framework 1100 in which speech recognition machines 130a-n are downstream from diarization machine 132. Each speech recognition machine 130 optionally may be tuned for a particular individual speaker (e.g., Bob) or species of speakers (e.g., Chinese language speaker, or English speaker with Chinese accent). In some embodiments, a user profile may specify a speech recognition machine (or parameters thereof) suited for the particular user, and that speech recognition machine (or parameters) may be used when the user is identified (e.g., via face recognition). In this way, a speech recognition machine tuned with a specific grammar and/or acoustic model may be selected for a particular speaker. Furthermore, because the speech from each different speaker may be processed independent of the speech of all other speakers, the grammar and/or acoustic model of all speakers may be dynamically updated in parallel on the fly. In the embodiment illustrated in FIG. 11, each speech recognition machine may receive segments 604 and labels 608 for a corresponding speaker, and each speech recognition machine may be configured to output text 800 with labels 608 for downstream operations, such as transcription.

Figure 12:
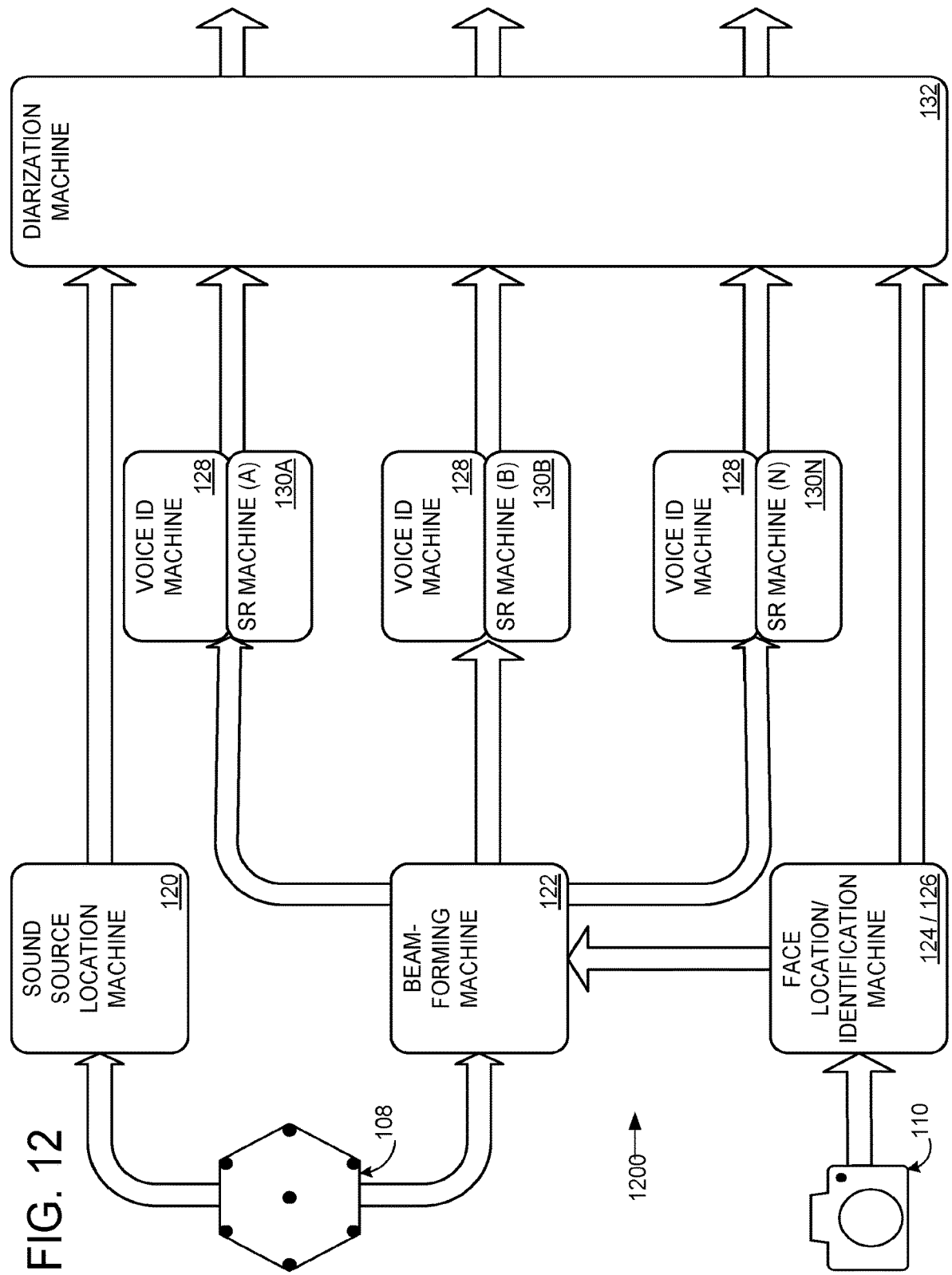
FIG. 12 schematically shows an exemplary diarization framework in which speech recognition machines are upstream from a diarization machine.

FIG. 12 shows a nonlimiting framework 1200 in which speech recognition machines 130a-n are upstream from diarization machine 132. In such a framework, diarization machine 132 may initially apply labels 608 to text 800 in addition to or instead of segments 604. Furthermore, the diarization machine may consider natural language attributes of text 800 as additional input signals when resolving which speaker is responsible for each utterance.

Figure 13:
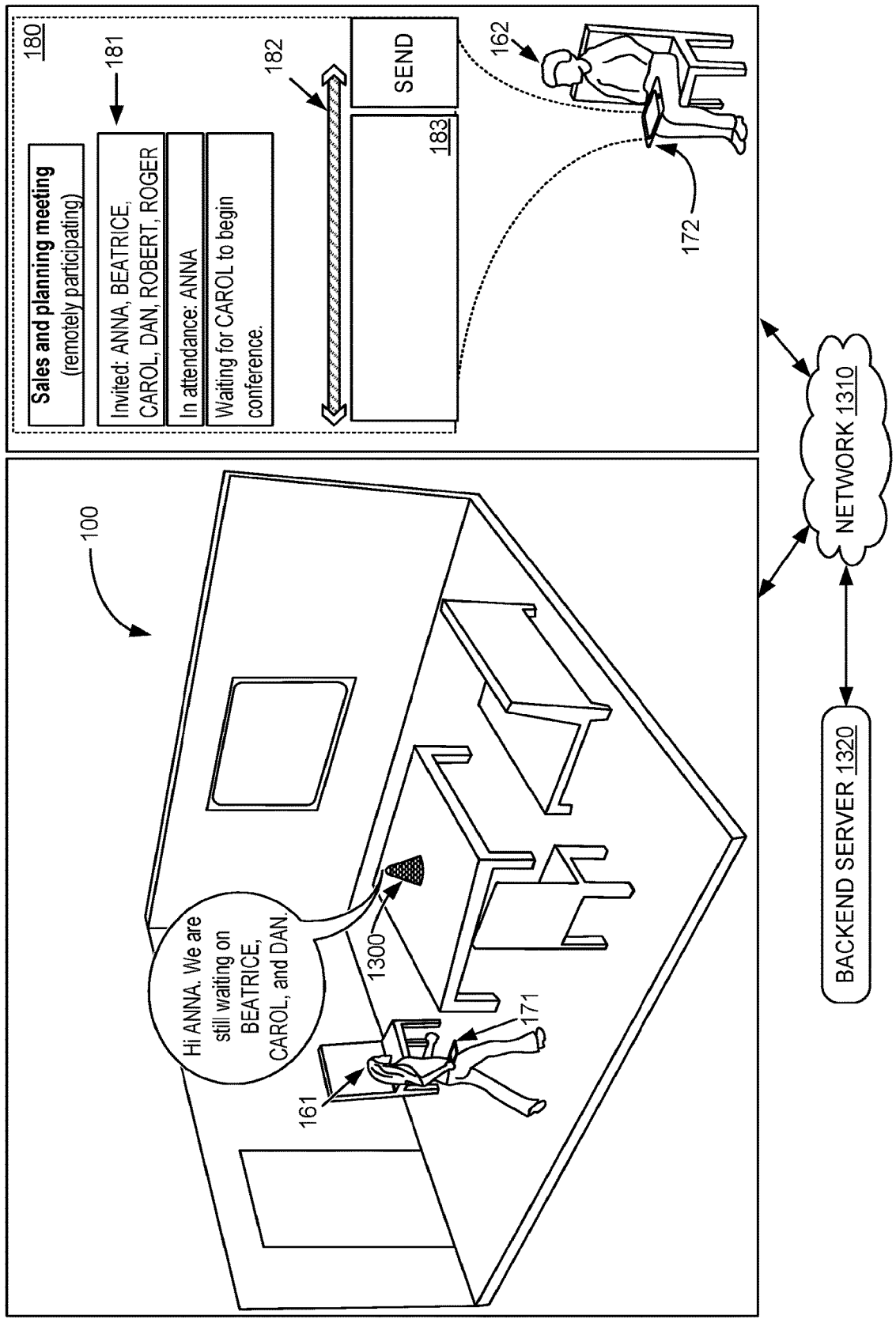
FIG. 13 shows an exemplary conference environment in which a computerized intelligent assistant coordinates a conference in assistance of a plurality of conference participants.

FIG. 13 shows an exemplary conference environment 100 in which a computerized intelligent assistant 1300 coordinates a conference being held by a plurality of local and remote participants. Although the following examples depict a conference including four local participants (Anna, Beatrice, Carol, and Dan) and one remote participant (Roger), the systems and methods of the present disclosure may be used to facilitate any conference including at least one local participant and any suitable number of remote participants. Computerized intelligent assistant 1300 may incorporate a diarization machine and/or a diarization framework configured for recognizing speakers and transcribing events during a conference (e.g., diarization framework 600, diarization framework 1100, diarization framework 1200, and/or diarization machine 132). In some embodiments, computerized intelligent assistant 1300 may take the form of computerized conference assistant 106.

"Conference environment" is used herein to refer to any area in relative proximity to computerized intelligent assistant 1300, wherein computerized intelligent assistant 1300 is able to collect at least some audiovisual and/or other relevant data in order to observe conference participants within the conference environment (e.g., a conference room, office, or any other suitable location for holding a meeting).

"Conference participant" is used herein to refer to any user of computerized intelligent assistant 1300 and/or other computer devices communicatively coupled to computerized intelligent assistant 1300 when such user is involved in a conference in any capacity. For example, in addition to local users who physically attend the conference and remote users who participate in the conference remotely, "conference participants" is used herein to refer to conference organizers who participate in the planning and/or scheduling of the conference, even when such conference organizers do not physically or remotely participate in the conference. Similarly, "conference participants" is used herein to refer to prospective participants of a conference (e.g., users who are invited to the conference), even when such prospective participants do not actually attend the conference. Similarly, "conference participants" is used herein to refer to individuals who are mentioned during a conference (e.g., an individual from a same organization as another conference participant), even when such individuals do not directly participate in the conference.

Figure 22:
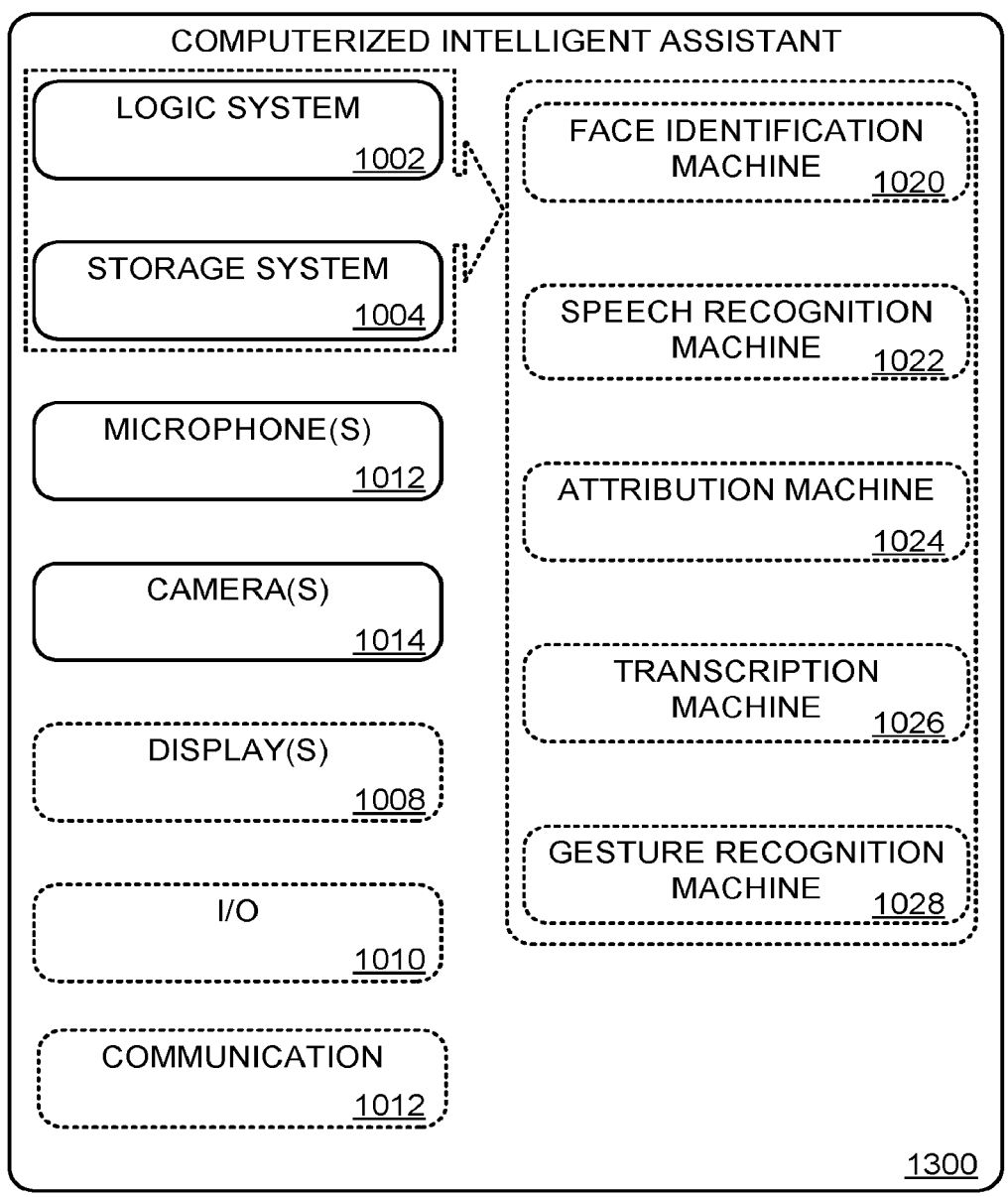
FIG. 22 shows an exemplary computing system.

Computerized intelligent assistant 1300 includes a microphone, a camera, and a speaker. Computing system 1300 of FIG. 22 provides an example platform for implementing computerized intelligent assistant 1300. Computerized intelligent assistant 1300 is configured to capture audiovisual information arising anywhere in and/or nearby the conference environment 100. Computerized intelligent assistant 1300 may be configured to spatially locate such captured audiovisual information, for example, by use of a fisheye camera, depth camera, microphone array (e.g., one or more microphones), or any other suitable sensor device(s). When computerized intelligent assistant 1300 includes one or more microphones (e.g., within a microphone array), the microphones may include direction-sensitive, position-sensitive, and/or direction- or position-insensitive microphones. Computerized intelligent assistant 1300 may be configured to recognize an identity of a conference participant based on such captured audiovisual information, e.g., by recognizing a face appearance and/or voice audio previously associated with the conference participant.

Returning to FIG. 13, computerized intelligent assistant 1300 is communicatively coupled, via a network 1310 to a backend server 1320. For example, the backend server 1320 may be a conference server computer device generally configured to facilitate scheduling a conference, communication among companion devices being used by conference participants, and/or any other suitable tasks to facilitate the conference in cooperation with computerized intelligent assistant 1300. Network 1310 may be any suitable computer network, e.g., the Internet. Any method or process described herein may be implemented directly on computerized intelligent assistant 1300 (e.g., via logic and/or storage devices of computerized intelligent assistant 1300). Alternately or additionally, such methods and processes may be at least partially enacted by backend server 1320. Backend server 1320 may comprise any suitable computing device, e.g., a server device in a single enclosure, or a cluster of computing devices. "Computerized intelligent assistant" may be used herein to refer to a single device (e.g., computerized intelligent assistant 1300 shown on the table in conference environment 100) or to a collection of devices implementing methods and processes described herein, e.g., computerized intelligent assistant 1300 in combination with backend server 1320.

User devices of remote and/or local participants (e.g., remote and/or local user devices), as well as other computing devices associated with a conference environment (e.g., a display monitor in the conferencing environment) may be referred to herein more generally as companion devices. Although the following description includes examples of displayed content (e.g., notifications, transcripts, and results of analysis) at a remote user device 172, such displayed content may be displayed at any companion device. Companion devices may include any suitable devices, e.g., mobile phones, personal computers, tablet devices, etc. In some examples, companion devices may be communicatively coupled to computerized intelligent assistant 1300. In some examples, communicative coupling may be via network 1310. In some examples, communication between companion devices and intelligent assistant 120 may be mediated by backend server 1320 (e.g., remote user device 172 may be communicatively coupled to backend server 1320 which in turn may facilitate a bidirectional flow of information between remote user device 172 and computerized intelligent assistant 1300). Alternately or additionally, companion devices may communicatively couple to computerized intelligent assistant 1300 directly via a wired and/or wireless connection, e.g., via Bluetooth®.

Figure 14:
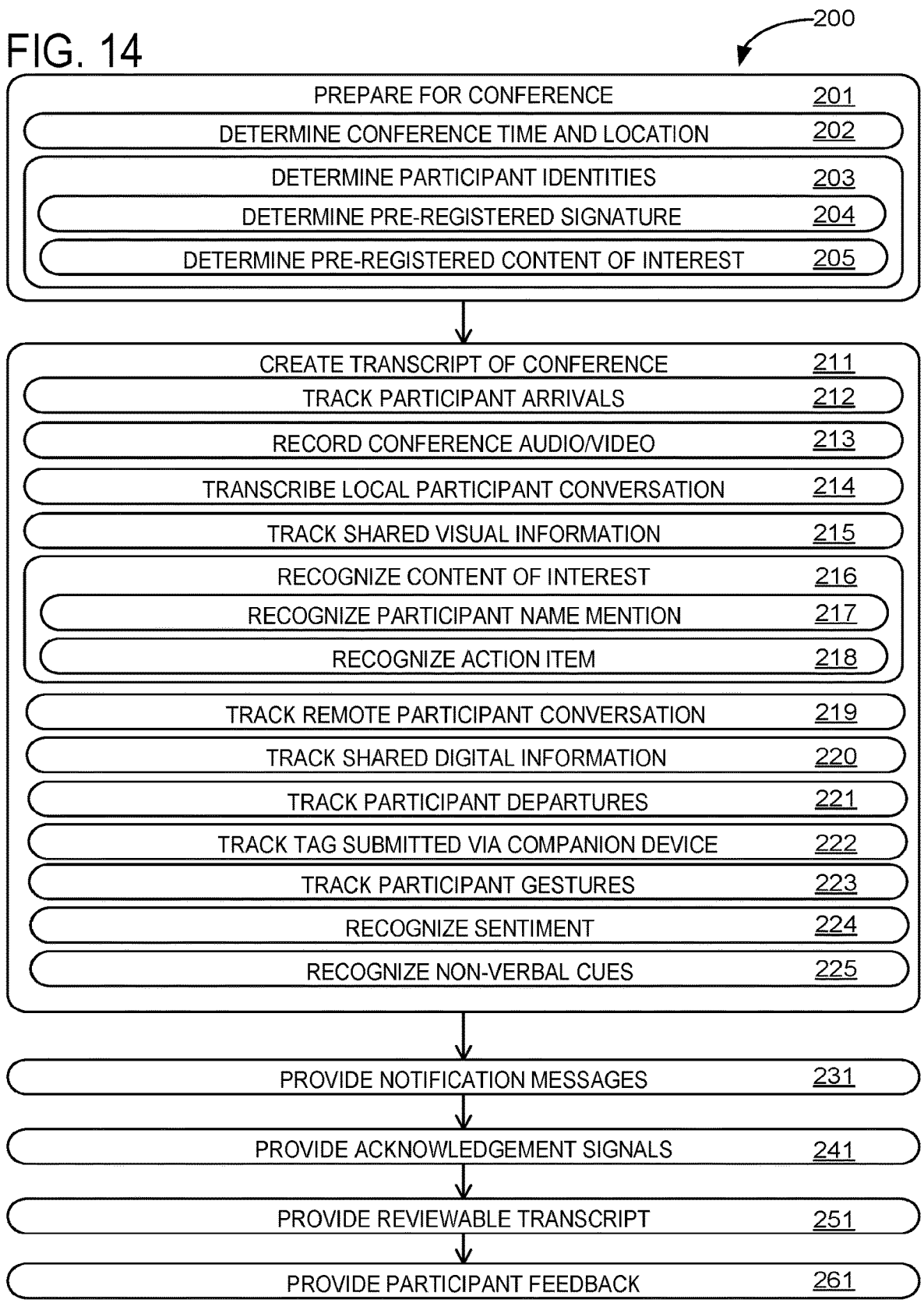
FIG. 14 shows a method of facilitating a conference with a computerized intelligent assistant.

Coordinating a conference including local and/or remote users may require computer-recognizing and tracking various data regarding the conference, before the conference begins and throughout the conference, in order to analyze such data and provide results of such analysis to conference participants in the form of notification messages, transcripts, feedback, etc. FIG. 14 shows a method 200 that may be performed by computerized intelligent assistant 1300 to facilitate a conference.

At 201, method 200 includes preparing for the conference (e.g., in advance of a start time of the conference). Accordingly, in advance of the conference, computerized intelligent assistant 1300 may receive information pertaining to the conference, e.g., location, schedule, and expected attendance. At 202, preparing for the conference includes determining a conference time and location. Determining the conference time and location may be based on receiving scheduling information from backend server 1320 or from any other computing devices (e.g., from a companion device of a conference participant, or based on a previous conversation with computerized intelligent assistant 1300 or with another, different computerized intelligent assistant, wherein such conversation includes a first conference participant asking computerized intelligent assistant 1300 to schedule a conference). Such scheduling information may be determined in advance by conference participants in any suitable manner, e.g., by adding an entry to a calendar program, or by sending an invitation to other conference participants via email, chat, or any other suitable notification messaging system. In some examples, a conference schedule and location may be determined in advance for one or more recurring conferences (e.g., a weekly meeting, a biweekly meeting, or a recurring meeting according to any other suitable schedule). In some examples, a conference schedule and location may be determined in a substantially ad-hoc manner shortly before the conference is scheduled to begin, e.g., by sending an invitation for a conference to be held immediately, or by a first conference participant asking computerized intelligent assistant 1300 to call one or more other conference participants to immediately join the first conference participant in conference environment 100. In some examples, computerized intelligent assistant 1300 may include a scheduling machine configured to determine a time and location of the conference.

In some examples, a location of a conference may be based on a description of a physical location (e.g., a room in a building, a global positioning system (GPS) coordinate, and/or a street address). In some examples, the location of the conference may be pre-defined by a conference participant in association with a schedule predefined for the conference. Alternately or additionally, a physical location may be inferred based on sensor data of one or more of computerized intelligent assistant 1300 and/or a companion device of a conference participant. In some examples, a location of the conference may be inferred based on a location of computerized intelligent assistant 1300 and/or a companion device of a conference participant (e.g., based on correlating a pre-defined map of rooms in a building with a configuration of computerized intelligent assistant 1300 with network 1310, such as an Internet protocol (IP) or media access control (MAC) address associated with a wired and/or wireless connection coupling computerized intelligent assistant 1300 to network 1310).

At 203, method 200 includes determining participant identities for expected conference participants. For example, such determination may be determined based on the conference schedule, e.g., when determining the conference schedule is based on invitations sent to the conference participants, such invitations indicate the expected (e.g., invited) conference participants. In some examples, expected participants may include all members of an organization and/or subset (e.g., department or team) of the organization. In some examples, expected participants may be inferred based on past participation, e.g., based on a frequency of attending a regularly scheduled meeting.

At 204, determining participant identities includes determining a preregistered signature for each participant, where such pre-registered signature may be useable to computer-recognize an identity of the participant (e.g., based on audiovisual data captured by computerized intelligent assistant 1300). For example, such signature for a conference participant may include a computer-readable representation of one or more exemplary audiovisual data, e.g., face photos, voice audio samples, and/or biometric data (e.g., fingerprint data). In some examples, the computer-readable representation may include the one or more exemplary audiovisual data directly (e.g., a face photo). In some examples, the computer-readable representation may include one or more identified features associated with the exemplary audiovisual data (e.g., visual markers indicating a shape and/or position of a facial feature). In some examples, a pre-registered signature for a conference participant may include an associated companion device (e.g., a MAC address of a mobile phone). In some examples, a signature for a conference participant may include an associated user account (e.g., an account in a meeting program running on a mobile phone communicatively coupled to backend server 1320 and/or computerized intelligent assistant 1300). In some examples, a pre-registered signature may be available for only a subset of conference participants, or a pre-registered signature may not be available for any conference participants. In some examples, the computerized intelligent assistant 1300 may include an identity machine configured to determine participant identities for a plurality of conference participants including a set of remote participants and a set of local participants. Determining a participant identity for a participant of the plurality of conference participants may include recognizing a pre-registered signature for the participant, wherein the pre-registered signature is useable to computer-recognize an identity of the participant. In some examples, one or more local and/or remote conference participants may be recognized by a face identification machine based on digital video received from a local and/or remote computing device (e.g., a companion device of a conference participant), for example, by operating the face identification machine to recognize one or more faces of one or more remote conference participants featured in a digital video captured by a remote companion device of the remote conference participant.

In some examples, a pre-registered signature for a conference participant may be retrieved from a secure personal data storage system (e.g., running on backend server 1320), wherein access to signature data for a conference participant is constrained based on a user credential and/or an enterprise credential (e.g., prohibiting access to the signature data for a conference participant by users other than the conference participant, and/or preventing access to the signature data by users outside of an organization to which the conference participant belongs). In some examples, signature data is only accessed by the secure personal data storage system and/or backend server 1320 for the purpose of identifying users in cooperation with computerized intelligent assistant 1300, and the signature data is not observable or otherwise accessible by conference participants. In some examples, in addition to being stored in a secure personal data storage system and/or backend server 1320, signature data is stored in one or more other locations (e.g., in the form of private signature data on a companion device of a user, enterprise signature data on an enterprise server, or in any other suitable location). The above-described approaches to handling (e.g., storing, securing, and/or accessing) signature data are non-limiting, exemplary approaches to handling sensitive data (e.g., private, confidential and/or personal data). A computerized intelligent assistant according to the present disclosure may utilize these exemplary approaches, and/or any other suitable combination of state-of-the-art and/or future methods for handling sensitive data.

The methods herein, which involve the observation of people, may and should be enacted with utmost respect for personal privacy. Accordingly, the methods presented herein are fully compatible with opt-in participation of the persons being observed. In embodiments where personal data (e.g., signature data, raw audiovisual data featuring a person, such as video data captured by a camera of computerized intelligent assistant 1320, and/or processed audiovisual data) is collected on a local system and transmitted to a remote system for processing, the personal data can be transmitted in a secure fashion (e.g., using suitable data encryption techniques). Optionally, the personal data can be anonymized. In other embodiments, personal data may be confined to a local system, and only non-personal, summary data transmitted to a remote system. In other embodiments, a multi-tier privacy policy may be enforced, in which different types of data have different levels of access and/or obfuscation/anonymization (e.g., enterprise biometric signature useable by all enterprise security systems to verify identity, but personal profile data only accessible by authorized users).

At 205, determining participant identities further includes recognizing preregistered content of interest for a participant. "Content of interest" may be used herein to refer to any topic or subject which may be of interest to a conference participant. Non-limiting examples of content of interest include any of: 1) a word and/or phrase, 2) a task (e.g., an intended task, or a commitment made by one or more conference participants), 3) an identity of another conference participant (e.g., a name or email address), 4) a digital file (e.g., a particular document), 5) analog multimedia and/or audiovisual content (e.g., a particular photo or diagram, such as a diagram shared on a whiteboard), and/or 6)

a date, time, and/or location. In some examples, content of interest for a conference participant may be pre-defined by the conference participant, by any other conference participant, or by another user in an organization associated with the conference participant (e.g., the conference participant's supervisor). In some examples, content of interest for a conference participant may be inferred based on previous interaction of the conference participant with computerized intelligent assistant 1300 and/or with computer services communicatively coupled to computerized intelligent assistant 1300 (e.g., another, different computerized intelligent assistant, an email program, and/or a note-taking program). In some examples, content of interest for a conference participant may be inferred based on a personal preference of the conference participant (e.g., wherein such personal preference is established through previous interactions with one or more computer services communicatively coupled to computerized intelligent assistant 1300). In some examples, content of interest for a conference participant may be inferred based on a current context of the conference participant, wherein such current context may be recognized based on previous interactions with one or more computer services communicatively coupled to computerized intelligent assistant 1300. In some examples, content of interest for a conference participant may be inferred based on a job title and/or role of the conference participant. In some examples, content of interest for a conference participant may be based on previous conferences including the conference participant, e.g., based on topics that arose in such previous conferences wherein the conference participant indicated potential interest in the topics by attending conferences at which the topics were mentioned and/or by participating in conversations in which the topics were mentioned.

At 211, method 200 further includes automatically creating a transcript of the conference. The transcript may record and/or otherwise track any suitable details of the conference. Non-limiting examples of details to be include in a transcript include: 1) participant arrival and departures, 2) conference audio/video, 3) transcribed conversations by local and/or remote participants, 4) visual information shared by conference participants (e.g., diagrams, drawings, photographs), 5) digital information shared by conference participants (e.g., document files, multimedia files, web addresses, email addresses, or any other digital content) and interaction with the shared digital information by conference participants (e.g., clicking on a next slide in a presentation), 6) gestures and/or non-verbal cues performed by the participants (e.g., hand gestures, laughing, and/or clapping), and/or 7) tag information submitted via companion devices of conference participants (e.g., indicating a bookmark or point of interest in the conference, or more generally any event occurring at a particular time). Any details included in the transcript may be correlated with a timestamp. Accordingly, the transcript may interleave details of the conference in a temporal order in which such details occurred in the conference. Whenever a detail is recorded, computerized intelligent assistant 1300 may provide a notification to one or more conference participants in real-time (e.g., a notification message sent to a companion device describing the recorded detail).

In some examples, computerized intelligent assistant 1300 may include a transcription machine configured to automatically create a transcript for the conference based on audiovisual data including video data captured by the camera and audio data captured by the microphone. Accordingly, the transcription machine may create a transcript including arrivals and departures of conference participants recognized in the audiovisual data, based on participant identities previously determined for the conference participants, and based on recognizing the participants based on the previously determined identities. In some examples, recognizing the participants may be performed by a face identification machine based on the previously determined identities (e.g., by recognizing a conference participant face based on similarity to a photograph of the conference participant face included in the previously determined identity for the conference participant). For example, the transcript may include an arrival time indicating a time of arrival of a conference participant, and/or a departure time indicating a time of departure of the conference participant. In some examples, the arrival time may be determined based on a time of recognition of a conference participant by the face identification machine.

The transcript created by the transcription machine may further include transcribed participant conversations for local and remote participants including transcribed speech audio of local participants captured by the microphone, and multimedia information shared at the conference, wherein the multimedia information shared at the conference includes analog visual content shared at a board, and wherein the transcript includes a timestamp indicating a time at which new visual content was added to the board and a graphical depiction of the new visual content. In a non-limiting example, the transcription machine may incorporate a diarization machine and/or a diarization framework configured for transcription (e.g., diarization framework 600, diarization framework 1100, diarization framework 1300 and/or diarization machine 132).

In some examples, creating the transcript may be based on operating a speech recognition machine to translate a computer-readable audio signal featuring speech audio of a conference participant into a text representing utterances contained in the speech audio. In some examples, creating the transcript may include operating an attribution machine to attribute speech audio and/or text to a conference participant. For example, the attribution machine may be configured to recognize a speaker in speech audio and attribute the speech audio to the conference participant, so that after the speech audio is translated into text by the speech recognition machine, the text may be attributed to the speaker. Alternately or additionally, the attribution machine may be configured to recognize a speaker based on text after translation by the speech recognition machine (e.g., based on word choice, speaking style, and/or any other suitable natural language features of the text). In a non-limiting example, the attribution machine may be configured to attribute a portion of transcript text to each conference participant of a plurality of conference participants. In some examples, the attribution machine may incorporate a diarization machine and/or a diarization framework configured for transcription (e.g., diarization framework 600, diarization framework 1100, diarization framework 1300 and/or diarization machine 132). Alternately or additionally, any suitable technique(s) for attributing speech audio and/or text to one or more speakers may be used to implement the attribution machine.

Furthermore, conference participants may be able to access the full transcript recorded so far in real time, during the conference, e.g., to review details that were previously recorded. In some examples, computerized intelligent assistant 1300 may provide a notification indicating whether or not it is currently recording a transcript (e.g., a notification message sent to a companion device, and/or a flashing green light during recording). In some examples, conference audio and/or video may be retained for a final transcript. In other examples, conference audio and/or video may be analyzed in order to recognize other details of the conference, and subsequently discarded. In some examples, conference audio and/or video may be only temporarily retained (e.g., to facilitate review of other details collected in a transcript) and subsequently discarded (e.g., at a predefined future date, or as directed by a conference participant). In some examples, backend server 1320 may be configured to maintain a running transcript of the conference including text attributed to each conference participant and/or other events of interest during the conference. Accordingly, backend server 1320 may be further configured to provide the running transcript of the conference to companion devices of conference participants, e.g., by sending the whole transcript, or by sending one or more "delta" data, each delta datum indicating a recent addition and/or change to the transcript.

Creating the transcript of the conference at 211 may include tracking participant arrivals at 212. Computerized intelligent assistant 1300 may track local participant arrivals and remote participant arrivals. "Arrival" may be used herein, with regard to remote participants, to refer to a time at which the remote participant is available for participation in the conference (e.g., when the remote participant remotely joins the conference via telephone, audio conference, video conference, or otherwise).

Computerized intelligent assistant 1300 may be configured to track the arrival of a local participant by recognizing an identity of the local participant. For example, FIG. 13 shows computerized intelligent assistant 1300 recognizing conference participant 161 as "Anna." Computerized intelligent assistant 1300 may recognize a local participant as they enter conference environment 100 based on audiovisual data captured by a camera and/or microphone of computerized intelligent assistant 1300 and/or a peripheral/cooperating device. Computerized intelligent assistant 1300 may recognize the local participant based on a pre-registered signature of the local participant, when such pre-registered signature is available.

In some examples, computerized intelligent assistant 1300 may constrain recognition of an arriving local participant to only recognize local participants who are expected to arrive based on the previously determined participant identities of expected participants. Alternately or additionally, computerized intelligent assistant 1300 may constrain recognition of an arriving local participant to only recognize any suitable set of potential conference participants and/or individuals who may be likely to enter conference environment 100. For example, such potential conference participants and/or individuals may include other individuals within an organization associated with the conference, and/or other individuals with offices resident in a building housing conference environment 100. In some examples, computerized intelligent assistant 1300 may recognize one or more different sets of individuals for recognition, e.g., 1) invited conference participants, 2) colleagues of the invited conference participants from the same organization who are likely to drop in to the conference, and/or 3) other individuals having offices in the building housing conference environment 100. In some examples, computerized intelligent assistant 1300 may be configured to prioritize using one or more of the different sets of individuals to attempt recognition, e.g., computerized intelligent assistant 1300 may be configured to first attempt to recognize an individual as one of the invited conference participants and to subsequently attempt to recognize the individual as a colleague from the same organization only if the individual was not recognized from among the invited conference participants. Such prioritization of a set of individuals for attempted recognition may improve a speed and/or computational efficiency of recognizing an individual when the individual is in the prioritized set.

In some examples, a local participant may not be immediately recognizable due to an insufficiency of data being used to identify the local participant (e.g., if the local participant's face is occluded, it may not be feasible to identify the local participant based on a pre-registered signature comprising a face visual appearance; similarly, if the local participant's companion device is turned off, information associated with the companion device may not be available for use in identification). In some examples, pre-registered participant identity data for a conference participant may not be available or may be incorrect or otherwise insufficient for identifying the conference participant. Accordingly, computerized intelligent assistant 1300 may assign the local participant a guest identity in order to defer identification of the local participant until more data is available. In an example, a first local participant is not immediately identifiable based on a face appearance (e.g., because no pre-registered face appearance data is available for the participant), but upon entering conference environment 100, a second local participant may greet the first local participant by name. Accordingly, computerized intelligent assistant 1300 may recognize the name of the first local participant based on audio data collected at a microphone of computerized intelligent assistant 1300, and identify the first local participant based on the name (e.g., by correlating the name with a name of an invited conference participant).

In an example, a conference participant may not be initially recognized upon entering conference environment 100, and computerized intelligent assistant 1300 may prompt the local participant to expressly provide further identifying information, e.g., by asking the local participant to provide a name. In some examples, when a local participant is recognized, computerized intelligent assistant 1300 may further prompt the local participant to register an identify to facilitate future recognition. Such prompting may include any suitable notification, e.g., a prompt at a companion device, and/or a question posed by computerized intelligent assistant 1300 via speech audio. Identifying information of a conference participant may include personal and/or sensitive data such as photos, voice audio samples, etc. Accordingly, prompting the local participant can include expressly informing the local participant as to specifically what identifying information is being stored for future use, and/or specifically how such identifying information may be used. In some examples, an image or audio clip of a guest user captured by computerized intelligent assistant may be associated with a "guest" identity and shared with other conference participants, who may positively identify the guest based on the image or audio clip. After sufficient information is available to identify a local participant, any guest identity associated with the local participant may be replaced and/or updated with a recognized identity.

In an example, computerized intelligent assistant 1300 may be configured to provide a notification to the conference leader indicating that a conference participant has been detected and is being tracked, while such conference participant has not yet registered a signature. The notification provided to the conference leader may include a sample of audio/video data associated with the conference participant that has been captured by computerized intelligent assistant 1300. Accordingly, the conference leader may respond to the provided notification by indicating an identity of the conference participant (e.g., by selecting a name, user account, and/or email address associated with the conference participant). Responsive to such selection, computerized intelligent assistant 1300 may automatically generate a signature (e.g., based on face image and/or voice audio) and register the signature for the conference participant. In some examples, computerized intelligent assistant 1300 is configured to automatically generate a signature only after first proposing to the user to do so and receiving affirmative permission from the user (e.g., by outputting speech audio asking for a natural language response indicating permission to automatically generate the signature). Alternately or additionally, computerized intelligent assistant 1300 may use the indicated identity for a display name for the conference participant (e.g., even when no signature has been generated for the conference participant). Computerized intelligent assistant 1300 may additionally use any available images of the conference participant to present a speaker image (e.g., in the transcript alongside the speaker's name associated with events in the transcript associated with the speaker). For example, a speaker image may be based on an image and/or raw video captured by a camera of computerized intelligent assistant 1300 (e.g., even when computerized intelligent assistant 1300 is unable to identify the conference participant based on such image), based on an image provided by another conference participant (e.g., based on an identifying image provided by the conference leader), and/or based on a previously saved image of the conference participant (e.g., a profile image).

In some examples, computerized intelligent assistant 1300 may be configured to continually or periodically collect new voice audio and face images to improve signature quality for one or more conference participants. For example, new voice audio and face images may be collected for a conference participant based on recognizing the conference participant according to a pre-registered signature and recording voice audio and face images associated with the recognized conference participant in order to incorporate such voice audio and face images in an updated signature. In some examples, a signature may be based on voice audio sufficient for robustly identifying a conference participant, while such signature is insufficient for robustly identifying the conference participant based on face images. Accordingly, when the conference participant is recognized based on voice audio, computerized intelligent assistant 1300 may record additional face images, so as to automatically improve the signature for the conference participant based on the face images. Similarly, in some examples, a signature may be based on face images sufficient for robustly identifying a conference participant, while such signature is insufficient for robustly identifying the conference participant based on voice audio; accordingly, when the conference participant is recognized based on face images, computerized intelligent assistant 1300 may record additional voice audio, so as to automatically improve the signature for the conference participant based on the voice audio. In this manner, signatures quality may be improved and signatures may be kept up-to-date (e.g., with regard to potential changes in face appearance and/or voice audio of conference participants), while reducing an enrollment effort for a conference participant to register a signature.

In some examples, computerized intelligent assistant 1300 may be configured to request permission from a conference participant to retain and subsequently use signature data, e.g., when computerized intelligent assistant 1300 automatically generates a signature for a previously unrecognized conference participant and/or when computerized intelligent assistant 1300 automatically improves a signature for a previously registered conference participant. In some examples, computerized intelligent assistant 1300 may be configured to request such permission during and/or after the conference. In some examples, computerized intelligent assistant 1300 may be configured to allow a conference participant to revoke permission and/or ask a conference participant to provide updated permission at any suitable interval, e.g., according to a schedule. Accordingly, signatures for identifying conference participants may be kept up-to-date, while also allowing a conference participant to control storage and usage of a signature identifying the conference participant.

Returning to FIG. 13, the conference has not yet begun, when a first conference participant 161 (Anna), arrives in the conference room. Accordingly, computerized intelligent assistant 1300 may determine that conference participant 161 is Anna. Although other conference participants are invited to the conference and expected to arrive shortly, such other conference participants have not yet arrived. Accordingly, computerized intelligent assistant may notify local participant 161 (Anna) of the situation.

Returning briefly to FIG. 14, at 231, computerized intelligent assistant may provide a notification message to conference participants. Using the above example, such notification may be provided by communicatively coupling to a local user device 171 (in the form of a mobile phone) of local participant 161 (Anna) in order to display a message at local user device 171 indicating that three other participants (Beatrice, Carol, and Dan) are expected to arrive but have not yet arrived. More generally, "notification" as used herein refers to any suitable notification and/or acknowledgement signal. "Notification message" is used herein to refer to any suitable means of notification, e.g., an electronic message sent via any suitable protocol (e.g., Short Message Service (SMS), email, or a chat protocol), an audio message output at companion device, an audio message output at computerized intelligent assistant 1300 or a different computerized intelligent assistant.

Returning briefly to FIG. 14, at 241, computerized intelligent assistant 1300 may alternately or additionally provide an acknowledgement signal. Using the above example, an acknowledgement signal may be used to inform local participant 161 (Anna) of status of other conference participants, e.g., by outputting speech audio informing Anna that three other participants (Beatrice, Carol, and Dan) are expected to arrive but have not yet arrived as shown in the speech bubble in FIG. 13. Alternately or additionally, computerized intelligent assistant 1300 may provide any other suitable notification, e.g., by showing a red light indicating that the meeting has not yet begun. More generally, an acknowledgement signal may include any suitable combination of audio output (e.g., speech) or visible signals (e.g., a color and/or flashing pattern of a light included in computerized intelligent assistant 1300, visual content output at a display included in computerized intelligent assistant 1300, and/or visual content output at the display of another device (e.g., local user device 171)).

The conference also includes one or more remote participants, e.g., remote participant 162 (Roger). Remote participants may be in any remote location, e.g., collaborating from home or collaborating during transit. In some examples, remote participants may be relatively near conference environment 100, e.g., in an office in a building housing conference environment 100 or even a local participant that is joining the conference via a network connection. Accordingly, computerized intelligent assistant 1300 may communicatively couple via network 1310 to a remote user device 172 of remote participant 162 (e.g., Roger's tablet device).

Computerized intelligent assistant 1300 may be configured to track the arrival of a remote participant based on the remote participant logging in to a remote conferencing program (e.g., a messaging application, voice and/or video chat application, or any other suitable interface for remote interaction). Alternately or additionally, computerized intelligent assistant 1300 may be configured to recognize an availability status of a remote participant (e.g., based on a status in the remote conferencing program) and to assume the remote user is present if the remote user is indicated to be available, in advance of the remote user logging in to a remote conferencing program. Accordingly, computerized intelligent assistant 1300 may provide a notification message to the remote participant inviting the remote participant to log in to the conferencing program, e.g., at a previously defined start time of the conference, when asked to do so by a local participant, or at any other suitable time. More generally, computerized intelligent assistant 1300 may be configured to recognize availability and/or attendance of a remote participant based on a status/context (e.g., power status or geographic location) of a remote user device of the remote participant. In some examples, a conference participant may authorize remote user devices to intelligently assess a remote user's availability based on one or more context signals (e.g., Roger is not available when on another phone call or when talking to children, but is available when working on a word processing document).

An expanded view 180 of a display of remote user device 172 is shown in FIG. 13. As shown in the expanded view 180, computerized intelligent assistant 1300 may provide information regarding the conference to remote user device 172 for display. For example, expanded view 180 further depicts a graphical user interface (GUI) for remote participation in the conference. The GUI includes transcript entries 181, as well as a transcript timeline scrollbar 182 and a chat entry box 183. Via the communicative coupling to network 1310 and computerized intelligent assistant 1300, remote user device 172 receives events for display among transcript entries 181. Accordingly, transcript entries 181 show basic details of the conference so far, namely indicating who is invited to the conference, who is already in attendance, and description of the process of receiving an invitation to connect to the conference, connecting, and retrieving a transcript so far. In particular, transcript entries 181 include a header indicating that the conference is regarding a "Sales and planning meeting" and indicating that remote participant 162 (Roger) will be remotely participating. Transcript entries 181 further include an indication of the expected (local and remote) conference participants (listing Anna, Beatrice, Carol, Dan, and Roger). Transcript entries 181 further include an indication of which local participants have already arrived in the conference room, namely local participant 161 (Anna). Therefore, even though Anna may not have announced her presence, Roger knows she is present.

Although only a small number of transcript entries 181 are shown so far, scrollbar 182 may be used to navigate through a timeline of the conference in order to view past and/or present details of the conference in the transcript. In the remainder of the present disclosure, expanded view 180 will be updated to show a small number of recent transcript entries 181. In subsequent figures, transcript entries 181 will be replaced with more recent entries as though scrolling through a transcript; accordingly, remote participant 162 (Roger) may use scrollbar 182 to navigate to previous entries (e.g., to display the entries shown in FIG. 15, after such entries have been replaced with more recent entries).

In some examples, a conference may have a previously designated presenter and/or organizer, referred to herein as a conference leader. For example, the conference leader of the "Sales and planning meeting" is Carol, who is not yet in attendance. Computerized intelligent assistant 1300 may be configured to take note when the conference leader is present. Accordingly, as shown in expanded view 180, remote participant 162 (Roger)'s display device may receive and display an indication that the conference participants are waiting for Carol, and this indication may be updated when Carol is present. In some examples, computerized intelligent assistant 1300 may be configured to encourage waiting to begin a conference until all invited conference participants are present, until a threshold proportion (e.g., 50%) of invited conference participants are present, or until particular participants (e.g., the conference leader) are present. In general, computerized intelligent assistant 1300 may provide any suitable indication to remote user device 172 in order to keep remote user 162 (Roger) apprised of the conference attendance and schedule.

Creating a transcript of the conference at 211 further includes recording conference audio and/or video at 213. Computerized intelligent assistant 1300 may be configured to begin recording audio and/or video at any suitable time. For example, computerized intelligent assistant 1300 may continuously record the conference environment 100. In another example, computerized intelligent assistant 1300 may wait to record until certain criteria are satisfied (e.g., after Carol arrives).

Figure 15:
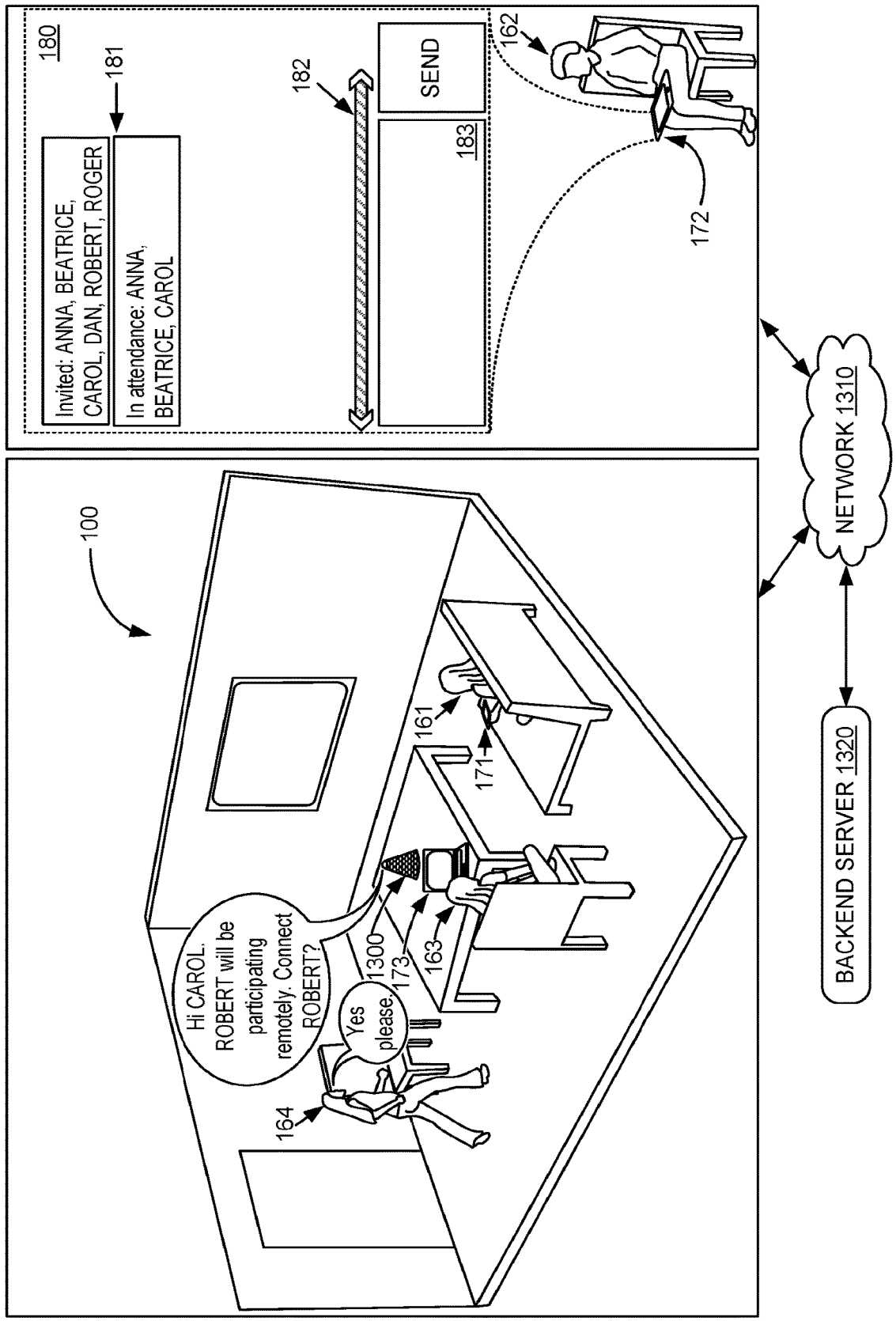
FIGS. 15-19 show example use cases in which a computerized intelligent assistant informs users about conference events of interest.

FIG. 15 shows conference environment 100 at a later time, after local participant 163 (Beatrice) has arrived, and as local participant 164 (Carol) is arriving. Local participant 163 (Beatrice) has set up an additional companion device, namely local user device 173 in the form of a laptop computer.

As local participants arrive at conference environment 100, computerized intelligent assistant 1300 may be configured to greet one or more of the local participants based on how many local participants are present. For example, computerized intelligent assistant 1300 may be configured to greet only the first local participant, e.g., to inform them that they are at the right location and on schedule. Accordingly, the first local participant may greet and/or converse with subsequently arriving local participants, obviating a utility of computerized intelligent assistant 1300 to provide such greeting and/or conversation. Accordingly, in the conference environment 100 shown in FIG. 15, computerized intelligent assistant 1300 may not have provided local participant 163 (Beatrice) with a greeting upon arrival. In some implementations, computerized intelligent assistant 1300 may be configured to greet a newly-arriving conference participant only if an already-present conference participant does not great the newly-arriving conference participant. In some examples, computerized intelligent assistant 1300 may be configured to greet each arriving local participant until specific criteria are satisfied (e.g., until the conference leader arrives or until a certain number of participants are present).

Computerized intelligent assistant 1300 may be configured to use a different greeting for an arriving local participant based on a role of the local participant. In an example, computerized intelligent assistant 1300 may be configured to greet a conference leader by asking whether to begin the conference. In an example, computerized intelligent assistant 1300 may be configured to greet a conference leader by asking whether to connect one or more remote participants.

For example, in FIG. 15, computerized intelligent assistant 1300 asks local participant 164 (Carol) whether to connect an additional remote participant, "Robert" (in addition to the local participants and remote participant 162 (Roger) who are already connected). As depicted in FIG. 15, computerized intelligent assistant 1300 is configured to interpret local participant 164 (Carol)'s response as an indication that the conference should begin (at the same time as the additional remote participant, Robert, is being connected), in lieu of explicitly asking whether to begin the conference.

Alternately or additionally, computerized intelligent assistant 1300 may be configured to greet a conference leader by asking whether to send a notification to participants who are not yet present. For example, the conference has four local invitees, of which only three are present at the time of local participant 164 (Carol)'s arrival; accordingly, since local participant Dan is not yet present, computerized intelligent assistant 1300 could ask Carol whether to remind Dan about the conference (not shown in FIG. 15) in addition to asking whether to connect Robert (as shown in FIG. 15). Similarly, computerized intelligent assistant 1300 may be configured to ask the conference leader whether to wait for one or more other members (e.g., to wait for all members to arrive, or to wait for an additional conference leader or designated presenter to arrive).

In some examples, one or more local and/or remote participants who are not invited to the conference or who are otherwise not-yet-attending the conference may be added to the conference after the conference begins. For example, a conference participant may ask computerized intelligent assistant 1300 to invite an additional remote participant to join, e.g., to include a colleague who has been mentioned in conversation or who is an expert on a topic being mentioned in conversation. Accordingly, computerized intelligent assistant 1300 may send a notification to the remote participant (e.g., for display at a companion device of the remote participant). The notification may include details of the conference so far as recorded in the transcript. For example, if local participant 164 (Carol) asks computerized intelligent assistant 1300 to invite a colleague who is an expert on a topic being mentioned in conversation, a notification sent to the colleague may include the location of the ongoing conference, along with an indication that the colleague was invited to join the ongoing conference by Carol, along with one or more sentences, phrases, and/or summaries from the transcript in which the colleague was mentioned and/or one or more sentences, phrases, and/or summaries from the transcript in which the topic was mentioned.

In the following description and in subsequent figures (FIGS. 16-19), backend server 1320 and network 1310 are no longer shown, although computerized intelligent assistant 1300 remains communicatively coupled to companion devices (e.g., remote user device 172) via backend server 1320 and network 1310. Similarly, in the following description and in subsequent figures (FIGS. 16-19), remote participant 162 (Roger) and remote user device 172 are not shown; instead, the subsequent figures focus on expanded display 180 of remote user device 172 in order to show interactions between remote participant 162 and local participants via the GUI shown in expanded view 180.

At 251 of FIG. 14, method 200 may further include providing a reviewable transcript to conference participants. Such reviewable transcript may be provided to companion devices of conference participants to be displayed in real-time (e.g., as shown in the evolving expanded view 180 in FIGS. 13 and 15-19). Alternately or additionally, such reviewable transcript may be provided to conference participants after the conference has ended. Such reviewable transcript may include content substantially similar to the content depicted in expanded view 180 of FIGS. 13 and 1519. As described above, and as will be shown further below, expanded view 180 shows the transcript at various different times in the conference. Accordingly, scrollbar 182 may be utilized to scroll to different times and/or recognized events (e.g., "E1") in order to view any details collected and recorded in the transcript, e.g., any of the details collected when performing method 200 or any other details of a conference described herein. In addition to using a scrollbar 182 to scroll to different times and/or events in the conference, the reviewable transcript may be indexed, searched, and/or filtered by any suitable details, e.g. speaker name, time range, words in transcribed conversation, or any other details recorded in the transcript as described herein. In some examples, the reviewable transcript may additionally include reviewable raw audio and/or video captured during the conference. In some examples, the reviewable audio and/or video may be associated with conference events, e.g., to allow navigating in the audio and/or video based on the transcript. In some examples, conference events may be associated with frames and/or short video clips from the reviewable video, and the frames/clips may be shown in the transcript along with conference events, e.g., allowing the frames/clips to be used for navigating in the transcript. Such clips and/or other aspects of the transcript may be used to access the complete audio and/or video recording from desired locations in the recording. In some examples, the reviewable transcript includes one or more difference images, showing changes to visual information shared during the conference along with indications of corresponding times at which the visual information was changed. In some examples, the reviewable transcript is configured to allow navigation based on images of shared visual information (e.g., difference images). For example, responsive to selection of the difference image, the reviewable transcript may be configured to navigate to a portion of the transcript corresponding to a time at which the visual information was changed as shown in the difference image.

Information displayed in the reviewable transcript may be tailored to a particular conference participant, by filtering or re-formatting events/details in the transcript. For example, although FIG. 15 has a transcript entry stating that Anna, Beatrice, and Carol are in attendance as depicted in expanded view 180 of remote user device 172 (e.g., Roger's mobile phone), a different companion device belonging to Anna may instead have a similar entry stating that Beatrice, Carol, and Roger are in attendance (e.g., omitting the indication that the conference participant who is viewing the companion device is in attendance). In some examples, information displayed in the reviewable transcript may be summarized and/or contextualized to draw attention to events of potential interest to a conference participant.

In an example, when a conference participant arrives at the conference late or leaves the conference early, the reviewable transcript may focus on portions of the conference during which the conference participant was absent. Similarly, the reviewable transcript may focus on specific times in the transcript when the conference participant's name, or content of interest to the participant, was mentioned. For example, if a conference participant leaves early, the reviewable transcript may focus on a time at which the conference participant's name was mentioned, along with a previous and following sentence, phrase, or summary to provide context. In some examples, the reviewable transcript may be provided to all conference participants, even conference participants who were invited but never showed up, conference participants who were merely mentioned in the conference, and/or conference participants having content of interest that was mentioned in the conference (even when such participants were never invited).

More generally, the reviewable transcript may be analyzed using any suitable machine learning (ML) and/or artificial intelligence (AI) techniques, wherein such analysis may include, for raw audio observed during a conference, recognizing text corresponding to the raw audio, and recognizing one or more salient features of the text and/or raw audio. Non-limiting examples of salient features that may be recognized by ML and/or AI techniques include 1) an intent (e.g., an intended task of a conference participant), 2) a context (e.g., a task currently being performed by a conference participant), 3) a topic and/or 4) an action item or commitment (e.g., a task that a conference participant promises to perform). More generally, ML and/or AI techniques may be used to recognize any content of interest based on raw audio, raw video, and/or corresponding text. In some examples, ML and/or AI systems may be trained based on user feedback regarding salient features of raw audio and/or corresponding text. For example, when conference participants use tags submitted via companion devices and/or gestures to flag events of interest during a conference, the flagged events may be used, in association with raw audio occurring at the time the events were flagged, as training data for supervised training of ML and/or AI systems to recognize events which conference participants are likely to flag in future conferences. Training of ML and/or AI systems to recognize salient features may be conducted for a limited set of users (e.g., for an organization or for a team within an organization) or for a larger population of users. Analyzing the reviewable transcript or any other aspect of the conference may be performed using any suitable combination of state-of-the-art and/or future ML, AI and/or natural language processing (NLP) techniques, e.g. ML, AI and/or NLP techniques described above.

In some examples, the reviewable transcript may be provided to other individuals instead of or in addition to providing the reviewable transcript to conference participants. In an example, a reviewable transcript may be provided to a supervisor, colleague, or employee of a conference participant. In an example, the conference leader or any other suitable member of an organization associated with the conference may restrict sharing of the reviewable transcript (e.g., so that the conference leader's permission is needed for sharing, or so that the reviewable transcript can only be shared within the organization, in accordance with security and/or privacy policies of the organization). The reviewable transcript may be shared in an unabridged and/or edited form, e.g., the conference leader may initially review the reviewable transcript in order to redact sensitive information, before sharing the redacted transcript with any suitable individuals. The reviewable transcript may be filtered to focus on content of interest (e.g., name mentions and action items) for any individual receiving the reviewable transcript.

One or more conference participants (e.g., a conference leader or a designated reviewer) may review the reviewable transcript in order to edit the transcript, e.g., to correct incorrectly transcribed conversation based on recorded conversation audio, to remove and/or redact transcript entries, and/or to provide identification for conference participants who were not identified or who were incorrectly identified. Such corrective review may be done in real-time as the conference transcript is gathered, and/or after the conference has ended.

After the conference, the reviewable transcript may be sent to each conference participant and/or saved to the computerized intelligent assistant 1300 and/or backend server 1320 for archival and subsequent use. The reviewable transcript may be saved in association with one or more computer services, e.g., an email application, a calendar application, a note-taking application, and/or a team collaboration application.

Figure 16:
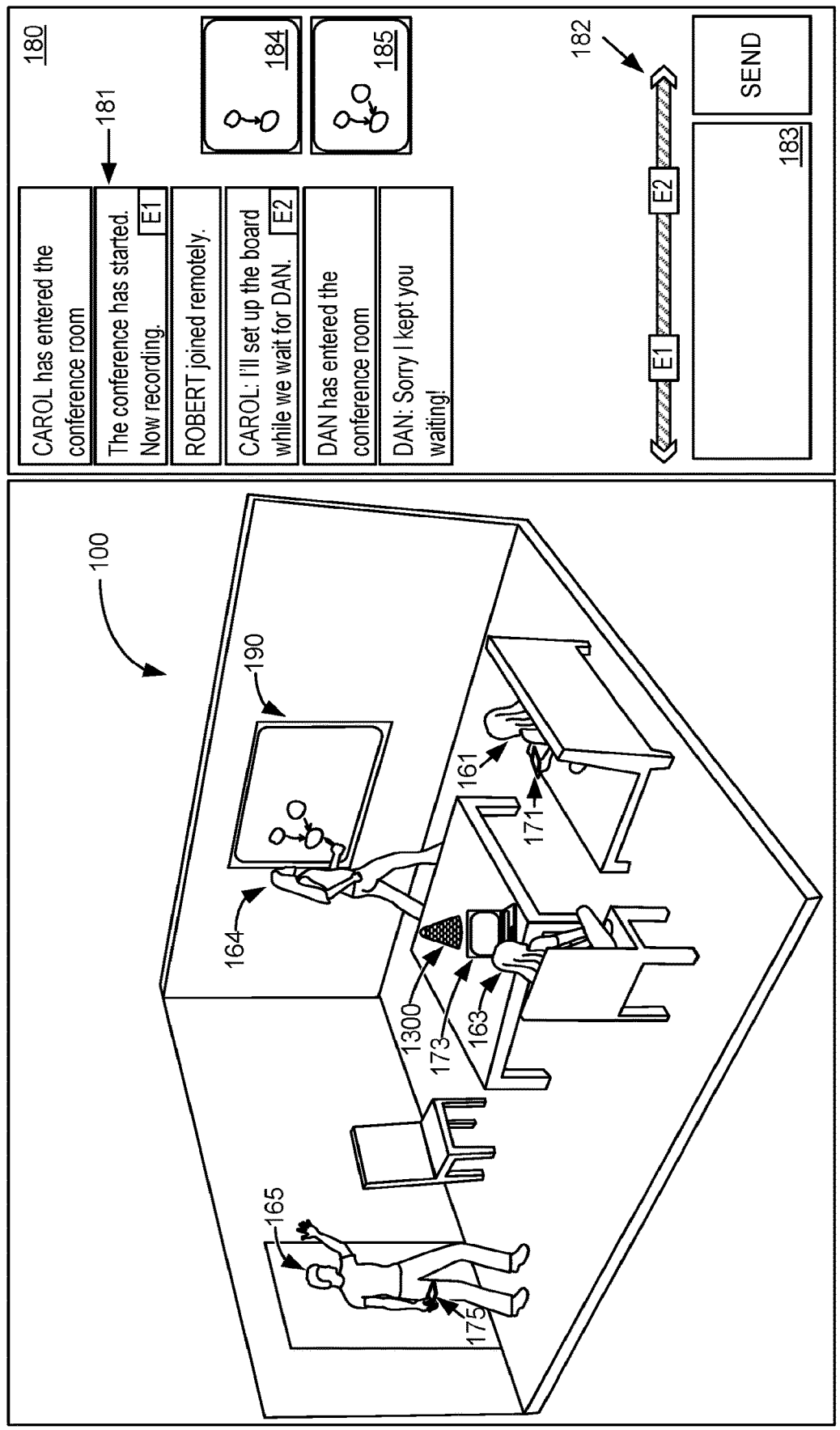

FIG. 16 depicts conference environment 100 at a later time relative to FIG. 15. As depicted in FIG. 16, expanded view 180 shows that the transcript entries 181 are updated to include further details of the conference so far. Furthermore, scrollbar 182 is updated to include events "E1" and "E2," correlated with particular events among transcript entries 181. For example, event "E1" indicates the start of the conference, when local participant 164 (Carol, the conference leader) arrived. In some examples, the GUI depicted in expanded view 180 may allow remote participant 162 (Roger) to navigate to specific times in the transcript by selecting an event shown on the scrollbar 182. Although events are depicted herein with generic labels (e.g., "E1" and "E2"), a GUI for conference participation and/or transcript review may instead use descriptive labels (e.g., words and/or symbols) to indicate a specific type of event, e.g., a name mention, an action item, a shared file, or any other suitable event as described herein.

As shown in the transcript, after local participant 164 (Carol, the conference leader) arrived, local participant 164 (Carol) stated that she would set up the board while waiting for another local participant 165 (Dan). Returning briefly to FIG. 14, creating the transcript at 211 further includes transcribing local participant conversation at 214. Such transcribing of local participant conversation may include correlating speech audio of the local participant conversation with textual transcription of the speech audio, e.g., using natural language user interfaces and/or natural language processing machines of computerized intelligent assistant 1300 and/or backend server 1320. Such transcribing of local participant conversation may further include correlating speech audio of the local participant conversation with an identity of a local participant, e.g., based on correlating speech audio with a preregistered signature of the local participant, and/or based on correlating a physical location of the speech audio captured by a position-sensitive microphone (e.g., a microphone array) with a physical location of a speaker (e.g., as identified based on recognizing a physical location of an identified face). Accordingly, the transcript includes speech text based on transcribed speech audio captured when local participant 164 (Carol) spoke. "Board" may be used herein to refer to a whiteboard 190, or more generally to refer to any suitable medium for sharing visual information (e.g., analog multimedia content) with other local participants in conference environment 100, e.g., chalkboard, paper, computer display, overhead transparency display, and/or overhead camera display.

In some examples, transcribed speech and/or speaker identity information may be gathered by computerized intelligent assistant 1300 in real time, in order to build the transcript in real time, and/or in order to provide notifications to conference participants about the transcribed speech in real time. In some examples, computerized intelligent assistant 1300 may be configured, for a stream of speech audio captured by a microphone, to identify a current speaker and to analyze the speech audio in order to transcribe speech text, substantially in parallel and/or in real time, so that speaker identity and transcribed speech text may be independently available. Accordingly, computerized intelligent assistant 1300 may be able to provide notifications to the conference participants in real time (e.g., for display at companion devices) indicating that another conference participant is currently speaking and including transcribed speech of the other conference participant, even before the other conference participant has finished speaking. Similarly, computerized intelligent assistant 1300 may be able to provide notifications to the conference participants including transcribed speech of another conference participant, even before the other conference participant has been identified and even before the other conference participant has finished speaking.

Computerized intelligent assistant 1300 may be able to capture images of shared visual information (e.g., from whiteboard 190). Returning briefly to FIG. 14, creating the transcript at 211 may further include tracking shared visual information at 215. Tracking shared visual information may include detecting a change to a board or other location at which visual information is being shared, e.g., by detecting new visual content such as a new diagram added to the board. Tracking the shared visual information may include correlating each change to the board with a timestamp. Tracking the shared visual information may include enhancing and/or correcting a captured image of the board. Enhancing and/or correcting the captured image may include geometric corrections (e.g., to correct a skew introduced by a point of view of a camera of computerized intelligent assistant 1300 relative to whiteboard 190), correcting a sharpness, brightness, and/or contrast of the board (e.g., by quantizing colors detected by a camera of computerized intelligent assistant 1300 to a limited number of colors corresponding to the number of different ink colors used to write on whiteboard 190), and/or performing optical character recognition to identify text and/or symbols drawn on the board. Accordingly, the enhanced and/or corrected image is a graphical depiction of new visual content that was added to the board, which may be saved in the transcript in association with a timestamp indicating when the new visual content was added. The transcription machine is configured to recognize visual information being shared by conference participants (e.g., in digital video captured by a camera of computerized intelligent assistant 1300 or in digital video captured by a companion device of a remote conference participant) and to include a digital image representing the visual information in the transcript. The transcription machine is further configured to recognize changes to the shared visual information, and accordingly to include difference images showing the changes to the visual information in the transcript, along with an indication of a time at which the visual information was changed (e.g., a timestamp for the change).

Accordingly, as depicted in expanded view 180, a GUI for remote participation may include one or more depictions of whiteboard 190 at various times throughout the conference. For example, expanded view 180 includes two depictions of whiteboard 190 as local participant 164 (Carol) adds content to whiteboard 190, namely a first depiction 184 and a second depiction 185 where further content has been added. In some examples, depictions of whiteboard 190 (e.g., first depiction 184 and second depiction 185) may be useable to navigate throughout the transcript, e.g., remote participant 162 (Roger) may be able to select first depiction 184 to navigate to a time in the transcript correlated with a timestamp indicating when the content shown in first depiction 184 was added to the board. Similarly, a remote participant may be able to select a time in the transcript (e.g., using scrollbar 182) and accordingly, the GUI may show a limited number of depictions of a board, e.g., a board at a previous moment correlated to the time in the transcript in conjunction with a previous and subsequent depiction of the board to provide context. Alternately or additionally, the GUI for remote participation may include a live video depiction of whiteboard 190 showing whiteboard 190 as content is added to it, in real time. In some examples, depictions of a board may be processed to remove occlusions, by depicting the board at moments when it was not occluded and/or by interpolating board content in occluded regions based on the board content at previous moments when such regions were not occluded. For example, as depicted in FIG. 16, local participant 164 (Carol) may temporarily occlude whiteboard 190 while adding content to it, but first depiction 184 and second depiction 185 show only the content of the board. Accordingly, the transcription machine is configured to recognize an occlusion of the shared visual information on the board, and to process previously-saved images of the board (e.g., difference images showing changes to the visual information on the board) to create a processed image showing the visual information with the occlusion removed, in order to include the processed image in the transcript.

Returning briefly to FIG. 14, creating the transcript at 211 further includes recognizing content of interest in the transcript at 216. Such content of interest may include any suitable content (e.g., pre-registered content of interest for a conference participant, as described above). In some examples, recognizing content of interest may include recognizing a name mention of a participant at 217. For example, as shown in FIG. 16, when local participant 164 (Carol) mentions local participant 165 (Da n)'s name, such mention may be recognized as an event "E2" of potential interest to local participant 165 (Dan) and/or to other conference participants. In some examples, computerized intelligent assistant 1300 may send a notification to one or more conference participants based on recognition of content of interest, e.g., computerized intelligent assistant 1300 may send a notification message to local user device 175 of local participant 165 (Dan), e.g., to remind Dan of the conference in case he has forgotten about it or in case he failed to receive/acknowledge an invitation. Accordingly, after receiving the notification message at local user device 175, local participant 165 (Dan) arrives at the conference and apologizes for his tardiness. In some examples, recognized name mentions may be shown (e.g., via transcript and/or notifications) to all conference participants. In other examples, a recognized name mention may be shown only to a subset of conference participants, e.g., only to remote participants, only to the conference leader, or only to conference participants whose own name was recognized. In some examples, the transcript may include an indication of a portion of the transcript related to content of interest for a conference participant, e.g., a timestamp indicating when the content of interest was discussed during the conference.

Returning briefly to FIG. 14, although not depicted in FIGS. 13 and 15-19, recognizing content of interest may further include recognizing an action item at 218. Recognizing an action item may be based on recognizing a commitment (e.g., when a conference participant promises to perform a task, or when a first conference participant requests that a second conference participant perform a task), or any other suitable detail arising in the conference which may indicate that one or more conference participants should follow up on a particular matter. Accordingly, such conference participants may receive a notification pertaining to the action item, and/or review events pertaining to the action item in a transcript.

Figure 17:
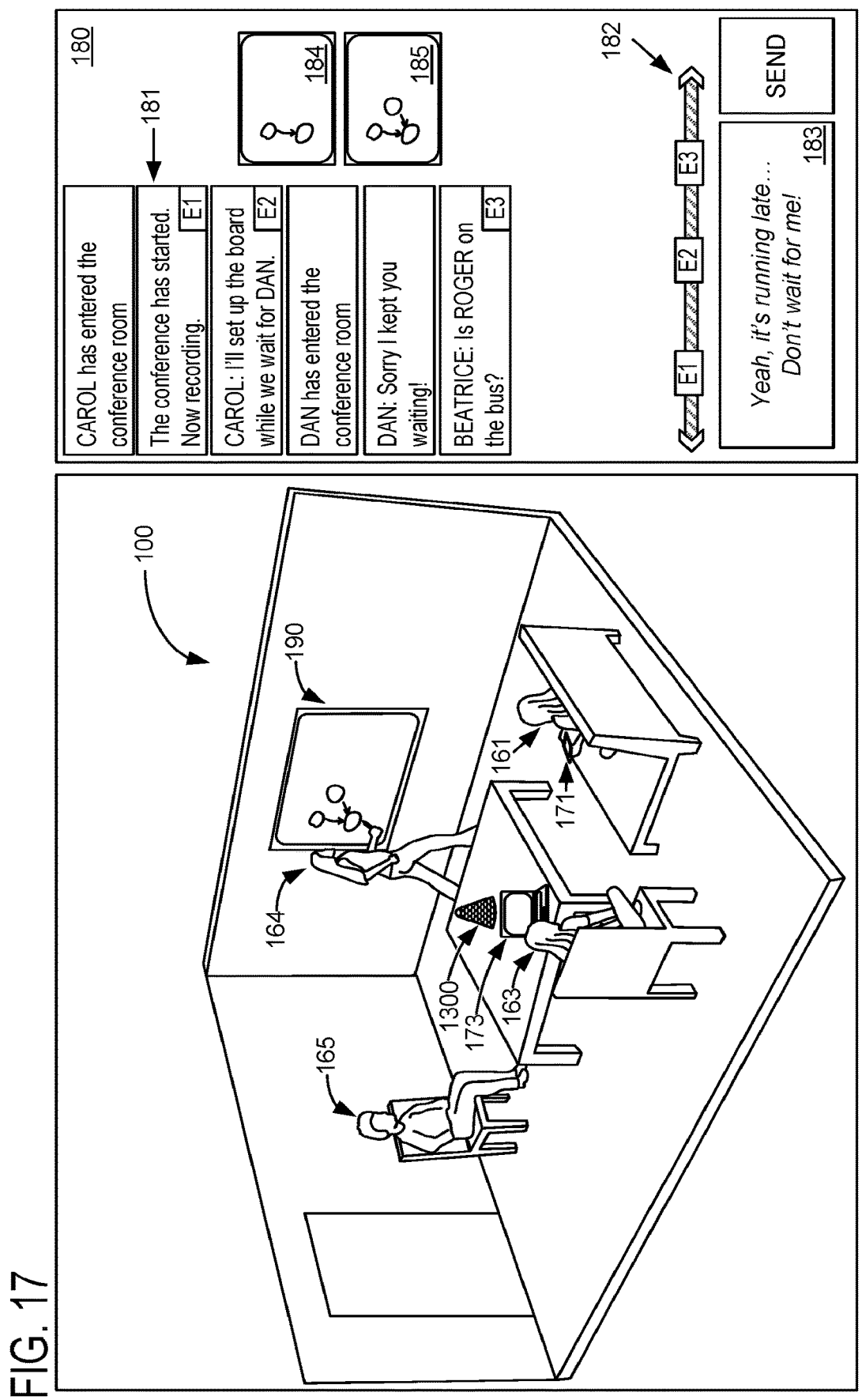

FIG. 17 depicts conference environment 100 at another later time relative to FIGS. 15 and 16, after local participant 165 (Dan) has found his seat. As shown in the transcript entries 181, local participant 163 (Beatrice) has asked whether remote participant 162 (Roger) is on the bus. Accordingly, based on recognizing Roger's name being mentioned, transcript entries 181 and scrollbar 182 denote an event "E3" associated with Beatrice's question. Remote participant 162 (Roger) has accordingly filled out chat entry box 183 indicating that he is indeed on the bus.

Figure 18:
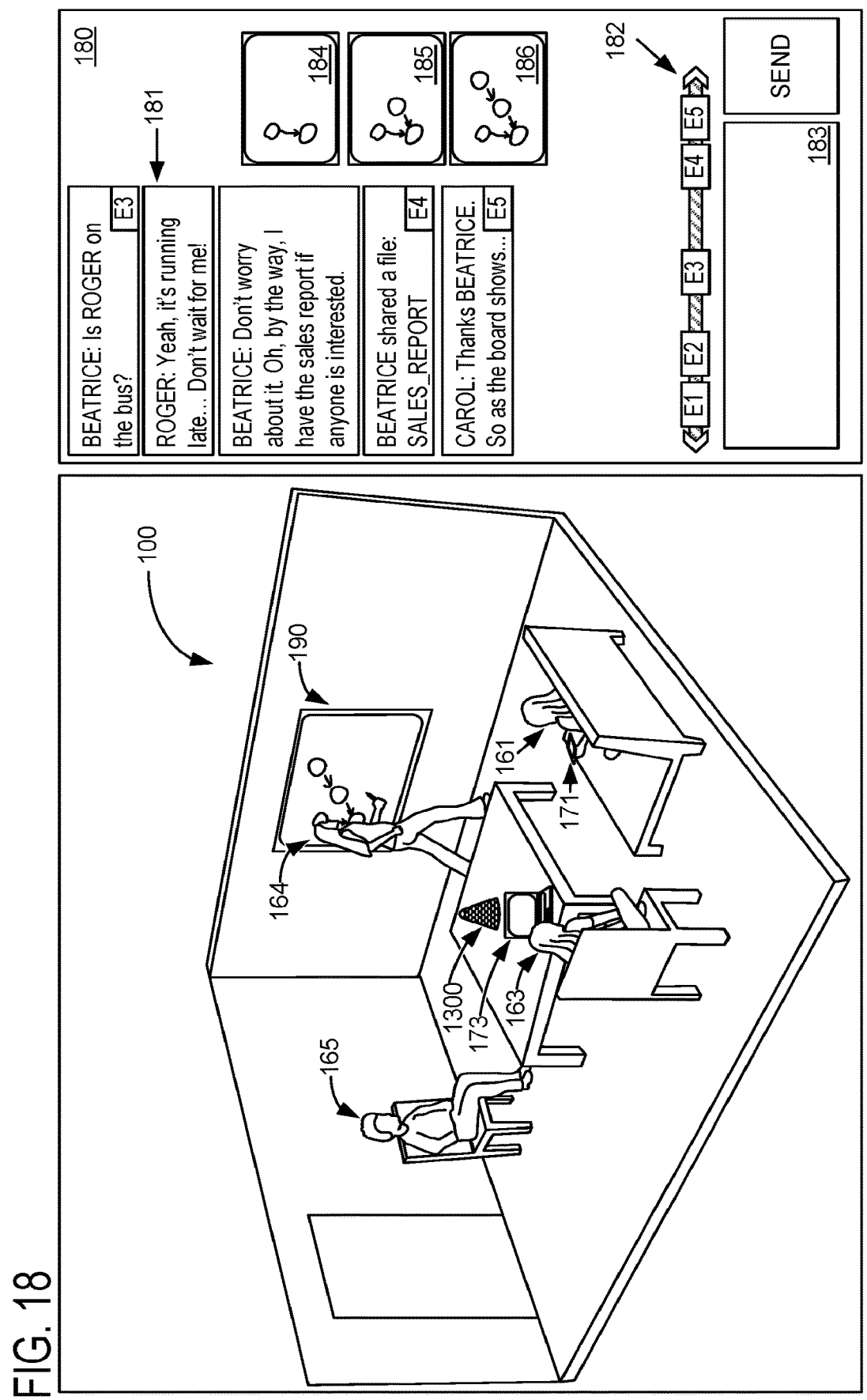

FIG. 18 depicts conference environment at another later time relative to FIGS. 15-17. Returning briefly to FIG. 14, creating the transcript further includes transcribing remote participant conversation at 219. Accordingly, as shown in expanded view 180 in FIG. 18, transcript entries 181 are updated to include remote participant 162 (Roger)'s response previously entered and sent via chat entry box 183.

In the present disclosure, remote participation is described in terms of remotely sending text messages via chat entry box 183, but remote participation may more generally include sending audiovisual data (e.g., voice/video call data) for listening/viewing by other (local and/or remote) conference participants, e.g., by outputting audio data at a speaker of computerized intelligent assistant 1300 and/or by displaying video data at a companion device. Similarly, although expanded view 180 of remote user device 172 depicts a text-based interface including a text transcript of the conference, a remote user device may alternately or additionally output audiovisual data (e.g., real-time speech audio and video of a local participant who is currently speaking).

Returning briefly to FIG. 14, creating the transcript at 211 may further include tracking shared digital information at 220. Such shared digital information may include any suitable digital content, e.g., word processor documents, presentation slides, multimedia files, computer programs, or any other files being reviewed by conference participants. For example, tracking shared digital information may include tracking a time at which one or more files were shared among conference participants. In some examples, tracking shared digital information may include tracking a time at which specific regions (e.g., pages or slides of a presentation, or a timestamp of a multimedia file) of a digital file were viewed, edited, or otherwise accessed by the conference participants. For example, such tracking may enable reviewing presentation slides alongside transcribed conversation. Accordingly, as shown in transcript entries 181 in FIG. 18, when Beatrice shares the "SALES_REPORT" file, such sharing is recorded in the transcript at an appropriate time and an event "E4" is generated, allowing navigation to when the file was shared. Although the foregoing example describes a digital file being shared by a local participant, digital files may be shared by any local or remote participant (e.g., by using a file submission interface of a GUI for remote participation, not depicted in FIGS. 13 and 15-19). When the transcript includes references to a shared digital content item, the transcript may additionally include a copy of the shared digital content item (e.g., as a digital file). Alternately or additionally, the transcript may additionally include a descriptor of the shared digital content item useable to retrieve the digital content item (e.g., a uniform resource locator (URL)). Accordingly, transcript events that refer to the shared digital content item (e.g., event "E4") may link to the digital content item or to a portion of the digital content item (e.g., event "E4" links to the "SALES_REPORT" file).

In some examples, shared digital information may be associated with a digital whiteboard. As digital content items are shared throughout the conference, the digital whiteboard may be updated to show content items that have been shared. Conference participants may additionally be able to add annotations to the digital whiteboard, where annotations may include any suitable content for display along with the shared content items, e.g., text, diagrams, and inking annotations more generally. The digital whiteboard may be configured to display each shared digital content item in a spatial location, e.g., so as to simulate arranging documents in a physical space. Accordingly, the annotations added to the digital whiteboard may indicate relationships between shared digital content items (e.g., by drawing an arrow from one digital content item to another). As with shared visual information and other details of the conference, whenever a digital content item or an annotation is shared to the digital whiteboard and/or whenever a digital content item on the digital whiteboard is modified, viewed, or mentioned in conversation, computerized intelligent assistant 1300 may add an event to the transcript describing the changes to the digital whiteboard and/or showing a snapshot of the digital whiteboard at a current time. In this manner, the digital whiteboard may be used to navigate the transcript and/or the transcript may be used to navigate changes to the digital whiteboard, similarly to with shared visual information (e.g., similarly to how a real whiteboard may be tracked by computerized intelligent assistant 1300). In some examples, the transcription machine is configured to receive an indication of a digital file to be shared from a companion device of a conference participant, and accordingly, to include an indication that the digital file was shared in the transcript. In some examples, the transcription machine is configured to recognize when a portion of the file is being accessed by any conference participant, and accordingly, to include an indication of the portion of the file that was accessed and a time at which the digital file was accessed.

Transcript entries 181 further include conversation among local participants (e.g., local participant 163 (Beatrice) and local participant 164 (Carol)), including conversation in which Beatrice's name is recognized and an event "E5" is generated based on the name mention. Furthermore, as shown in FIG. 18, local participant 164 (Carol) has updated whiteboard 190. Accordingly, in addition to first depiction 184 and second depiction 185 of whiteboard 190, expanded view 180 includes a third depiction 186 of whiteboard 190.

Figure 19:
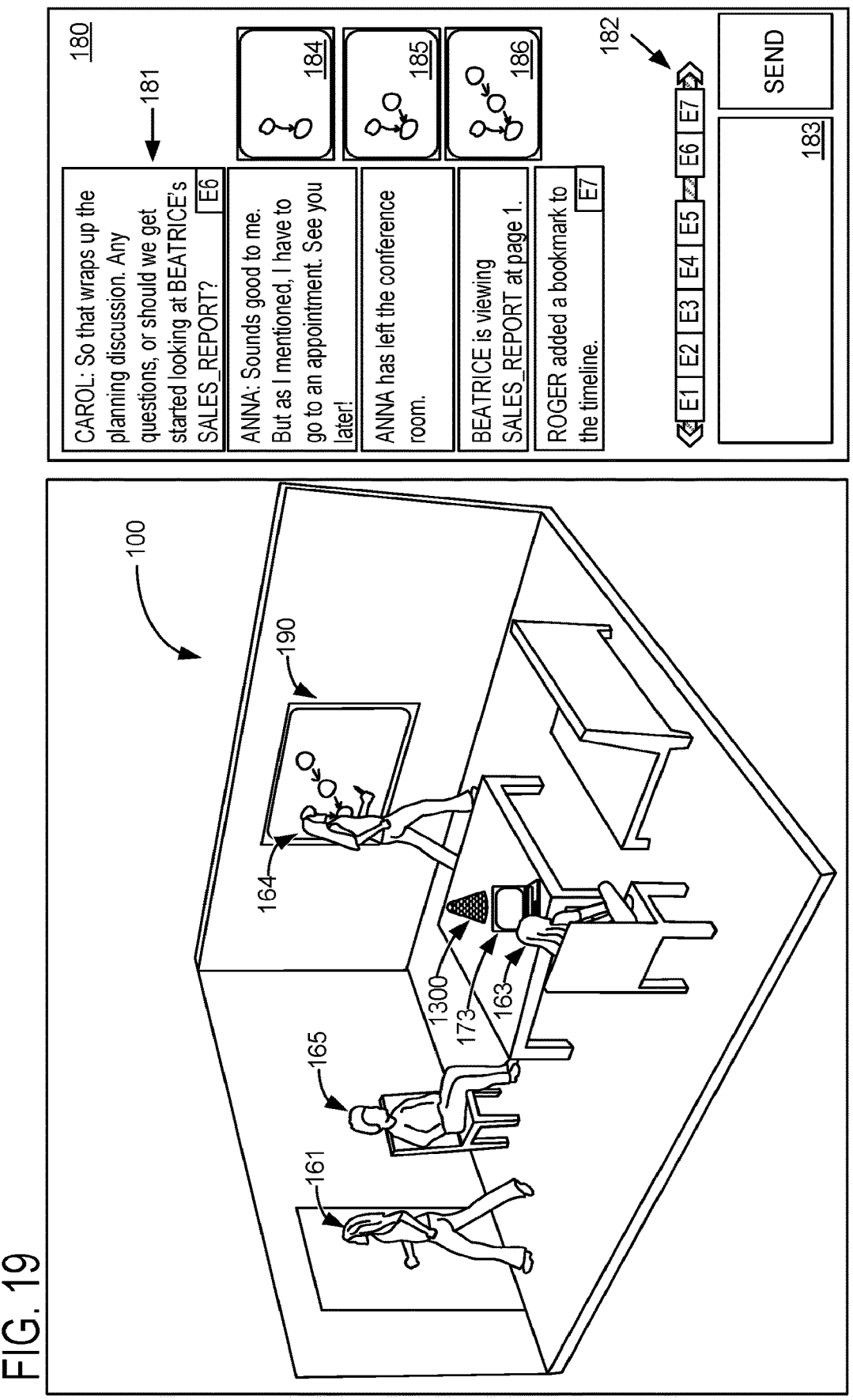

FIG. 19 shows conference environment 100 at another later time relative to FIGS. 15-18. Although not depicted, at this later time, the conference participants have engaged in substantially more conversation, causing the transcript entries 181 shown in expanded view 180 to scroll past entries shown in previous figures. As shown in the transcript entries 181, local participant 164 (Carol) proposes looking at the "SALES_REPORT" file previously shared by local participant 163 (Beatrice). However, at this time in the conference, local participant 161 (Anna) needs to leave due to a prior commitment. Returning briefly to FIG. 14, creating the transcript at 211 includes tracking participant departures at 221.

Tracking local participant departures may include recognizing a participant in similar fashion to as described above with regard to tracking participant arrivals, e.g., based on audiovisual data. Tracking participant departures may include, for a recognized local participant, tracking a physical location of the local participant (e.g., based on visual information captured at the camera or based on a companion device) and considering the participant to have departed after their physical location is a threshold distance outside of conference environment 100. Similarly, tracking participant departures may include, for a recognized local participant, recognizing that such local participant is no longer detectable within audiovisual data (even in absence of affirmative confirmation that such local participant has left conference environment 100). Similarly, tracking participant departures may include, for a recognized local participant, recognizing that such local participant is likely departing in advance of the local participant leaving conference environment 100. Such recognition may include tracking a trajectory of the physical location of the local participant (e.g., as the local participant walks towards an exit of conference environment 100). Such recognition may further include detecting an audiovisual cue indicating that the local participant is likely leaving, e.g., if the local participant says "goodbye" and waves to the other participants, and/or if the other participants say "goodbye" to the local participant. Multiple signals may be combined to detect participant departure, and such signals may be analyzed to determine a confidence of recognizing departure before the transcript is updated to indicate departure based on the confidence exceeding a predefined threshold; for example, if a local participant waves "goodbye" computerized intelligent assistant 1300 may infer that the participant is likely leaving with a first confidence, and if the local participant subsequently packs a bag and moves towards the door, computerized intelligent assistant 1300 may infer that the local participant is likely leaving with a second, higher confidence that exceeds the predefined threshold, causing computerized intelligent assistant 1300 to infer that the local participant is indeed leaving.

In some examples, computerized intelligent assistant 1300 may be configured to infer that a conference participant is likely leaving based on a schedule and/or context of the conference participant. In an example, computerized intelligent assistant 1300 may infer that a conference participant is leaving a first conference based on the participant being invited to a second, different conference occurring during and/or shortly after the first conference. In an example, computerized intelligent assistant 1300 may infer that a conference participant is leaving a conference based on the conference participant making a commitment during the conference, e.g., based on the conference participant announcing that they will begin a task immediately. Computerized intelligent assistant 1300 may combine the inference that a participant is likely leaving based on a schedule and/or context with other signals (e.g., waving "goodbye") and accordingly may infer that the conference participant is leaving with a relatively higher confidence (e.g., as compared to an inference based only on the conference participant's schedule or as compared to an inference based only on signals observed by computerized intelligent assistant 1300 in the conference environment).

Similar to tracking remote participant arrivals, tracking remote participant departures may be based on a login and/or availability status of the remote participant, e.g., based on the remote participant exiting from a GUI for remote participation.

Although not depicted in FIGS. 13 and 15-19, a conference participant may briefly depart from a conference only to return later, before the end of the conference (e.g., to take a break or to attend to another matter); accordingly, recording the transcript throughout the conference may include tracking multiple arrivals and departures for each conference participant. In addition to tracking individual departures at 221, computerized intelligent assistant 1300 may be configured to track when all conference participants leave, when a threshold portion (e.g., 50%) of conference participants leave, and/or when the conference leader leaves. Various departure criteria may be used in order to automatically end the conference and/or cease creating the transcript. In some examples, computerized intelligent assistant 1300 may be configured to prompt conference participants who are still in attendance as to whether the meeting should stop or whether recording should continue, wherein such prompting may include any suitable notification (e.g., a speech audio question, or a prompt displayed at a GUI of a companion device).

Returning to FIG. 19, after local participant 161 (Anna) leaves the conference room, transcript entries 181 include an indication that Anna has left.

Transcript entries 181 further indicate that local participant 163 (Beatrice) is viewing a specific page of the previously-shared "SALES_REPORT" file, e.g., on local user device 173.

Returning briefly to FIG. 14, creating the transcript at 211 may further include tracking a tag submitted via a companion device at 222. For example, a companion device may be configured to interpret a specific GUI input, gesture, audio command, or any other suitable input as an indication that a new event should be added to the transcript at a current timestamp. Such tag may indicate a time of interest (e.g., a bookmark) in the transcript or any other suitable event. In some examples, companion devices may be configured to recognize multiple different tags, each tag corresponding to a different event to record in the transcript. Accordingly, transcript entries 181 shown in expanded view 180 of FIG. 19 include an indication that remote participant 162 (Roger) added a bookmark to the timeline. As with other events, tags added via companion devices may indicate events of interest to a particular user and/or to all users.

Returning briefly to FIG. 14, creating the transcript at 211 may further include tracking participant gestures at 223 (e.g., hand gestures). Such gestures may include previously-defined gestures which may indicate an event and/or control behavior of computerized intelligent assistant 1300. Accordingly, recognizing gestures may be performed by a gesture recognition machine configured to recognize one or more gestures. The gesture recognition machine may be implemented via any suitable combination of ML and/or AI technologies, e.g., using a neural network trained for gesture recognition.

In an example, a hand gesture is an "off-the-record" gesture indicating that recording and/or automatically creating the transcript should be stopped. Accordingly, computerized intelligent assistant 1300 may, at least temporarily, stop automatically creating the transcript responsive to recognizing the "off-the-record" hand gesture (e.g., by the gesture recognition machine). After recognizing such gesture, computerized intelligent assistant 1300 may be configured to stop recording until a different "on-the-record" gesture and/or voice command is received. When going "off-the-record," computerized intelligent assistant 1300 may be configured to provide a notification (e.g., an acknowledgement signal such as a light turning from green to red) to local participants. When going "off-the-record," computerized intelligent assistant 1300 may be configured to notify remote participants (e.g., by providing a notification message at a companion device). In some examples, a transcript being viewed by local and/or remote participants may temporarily include "off-the-record" events (e.g., so that remote participants remain apprised of the situation) and such "off-the-record" events may be deleted from backend server 1320, computerized intelligent assistant 1300, and companion devices at a later time. Such later time could be the end of the conference, when going back on the record, or any other suitable later time (e.g., after 24 hours).

Alternately, computerized intelligent assistant 1300 may be configured to omit "off-the-record" events from the transcript entirely. When "off-the-record" events are omitted from the transcript, computerized intelligent assistant 1300 may provide conference participants with an indication that "off-the-record" events may be occurring. Alternately, computerized intelligent assistant 1300 may not inform conference participants that the conference is currently "off-the-record," or may only inform a subset of conference participants (e.g., a conference leader, only remote participants, or only a previously designated subset of participants) that the conference is currently "off-the-record." In examples where a companion device of a remote participant is configured to output audio/video of the conference, when the conference is "off-the-record," the conference audio/video optionally may be muted/not displayed to unauthorized remote participants (e.g., computerized intelligent assistant 1300 may not send conference audio/video to the companion device of the remote participant when the conference is "off-the-record"). In some implementations, authorization for off-the-record portions of a conference may be set based on user credentials/privileges, and in some implementations authorization may be dynamically set based on conference participant directive.

In an example, computerized intelligent assistant 1300 is configured to recognize a hand gesture to indicate a request and/or action item, so as to add an event to the transcript. In some examples, computerized intelligent assistant 1300 may be configured to recognize a plurality of different predefined gestures to indicate different kinds of events (e.g., similar to different kinds of tags submitted via companion devices, as described above). For example, the gesture recognition machine may recognize a gesture indicating that an event of interest occurred, and accordingly, responsive to detection of the gesture by the gesture recognition machine, the transcription machine may include in the transcript an indication that the event of interest occurred.

In an example, computerized intelligent assistant 1300 is configured to recognize a hand gesture in order to mediate conversation between local and/or remote participants. For example, computerized intelligent assistant 1300 may be configured to recognize a raised hand as a gesture indicating that a local participant wishes to interject, and accordingly, responsive to recognizing a raised hand gesture, may facilitate interjection by alerting other participants and/or adjusting recording.

Creating the transcript at 211 may include recognizing a sentiment at 224. For example, recognizing such sentiment may include operating a machine learning classifier previously trained to classify words and/or phrases as positive, negative, and/or associated with a specific sentiment (e.g., "happy" or "angry"). In some examples, the machine learning classifier may be configured to receive raw audio and/or video data and to recognize sentiment based on the raw audio data (e.g., based on tone of voice) and/or based on the raw video data (e.g., based on facial expressions and/or body language). Alternately or additionally, the machine learning classifier may be configured to receive any other suitable transcript data automatically recorded at 211, e.g., transcribed speech audio in the form of text. The transcription machine may be configured to analyze the transcript to detect words having a predefined sentiment (e.g., positive, negative, "happy", or any other suitable sentiment), in order to present a sentiment analysis summary at a companion device of a conference participant, indicating a frequency of utterance of words having the predefined sentiment.

Creating the transcript at 211 may include recognizing non-verbal cues at 225. For example, such non-verbal cues may include laughter, raised voices, long pauses/silences, applause, interruptions, and any other features of the timing and/or delivery of conversational content that may arise during natural conversation.

Although FIGS. 13 and 15-19 depict non-limiting examples of events that are recognized/tracked by computerized intelligent assistant 1300 to generate real-time notifications and/or to add to a reviewable transcript, any other events or details of conferences described herein may be recognized/tracked by computerized intelligent assistant 1300 for the purpose of generating notifications and recording the reviewable transcript.

Returning to FIG. 14, method 200 further includes providing participant feedback at 261. Such feedback may be based on any suitable details observed throughout the conference at 211 (e.g., based on analyzing a conference transcript or based on analyzing details as they are observed throughout the conference). In some examples, such feedback may be based on sentiment recognized at 224 and nonverbal cues recognized at 225.

Figure 20:
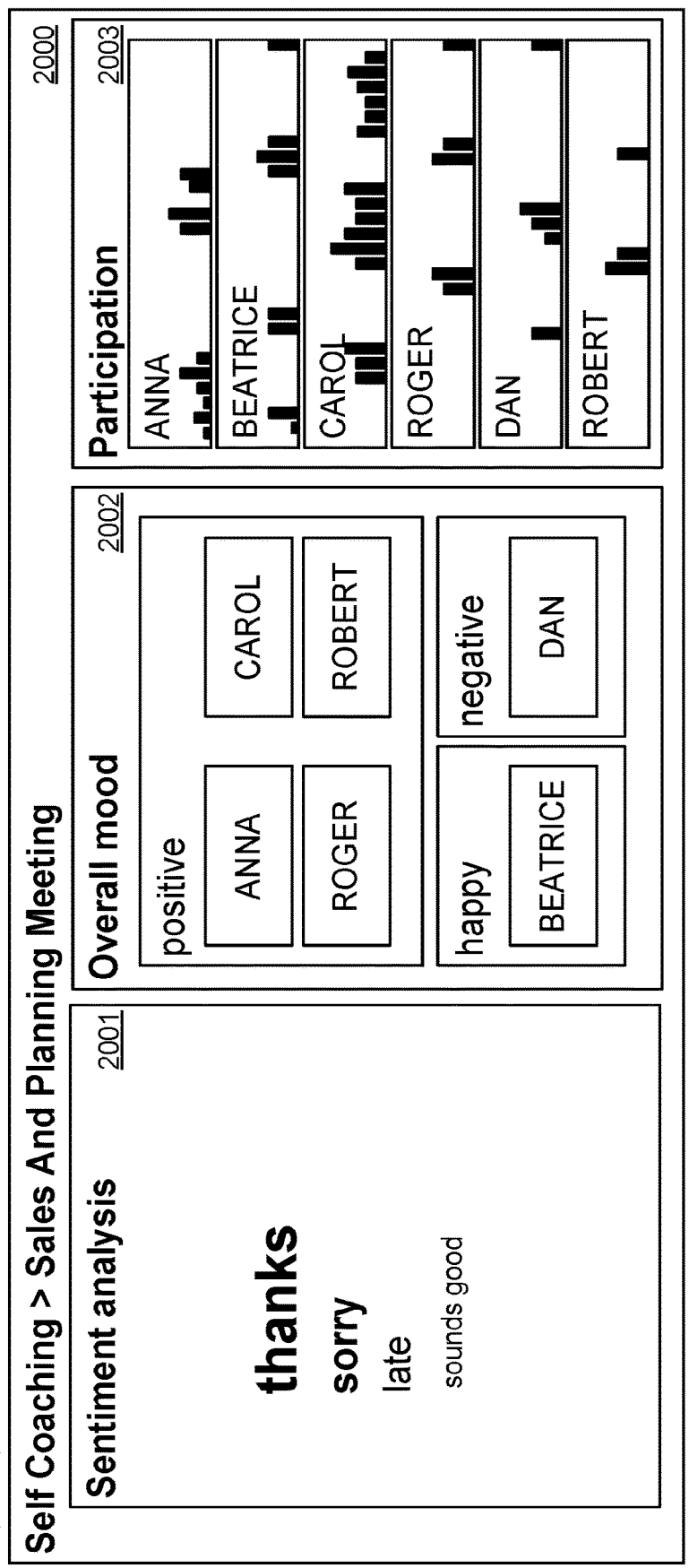
FIG. 20 shows an example use case in which a computerized intelligent assistant provides feedback to a conference participant.

FIG. 20 shows a non-limiting example of participant feedback 2000 based on details observed during a conference. For example, participant feedback 2000 may be displayed at a companion device, saved to backend server 1320, or otherwise made available to the conference participants or others. Participant feedback 2000 may be used for self-coaching, e.g., to improve the conference experience and to help conference participants learn how to work more effectively with each other.

Participant feedback 2000 includes a sentiment analysis summary 2001, including a "word cloud" of sentiment-related words that occurred in the transcript, visually depicted with a size indicating their frequency of utterance (e.g., "thanks" was the most frequent sentiment-related word observed during the conference).

Participant feedback 2000 further includes an overall mood summary 2002 indicating which conference participants expressed various overall moods. For example, overall mood summary 2002 may be based on a frequency of utterance of sentiment-related words corresponding to different sentiments, e.g., an average sentiment. As depicted, Anna, Carol, Robert, and Roger expressed positive sentiment on average, whereas Beatrice expressed happy sentiment on average and Dan expressed negative sentiment on average.

Participant feedback 2000 further includes a participation summary 2003 indicating when different conference participants spoke or otherwise participated during the conference (e.g., as a histogram with the X-axis indicating periods of time in the conference and the Y-axis indicating frequency of participation during each period of time). Alternately or additionally, participant feedback may indicate whether each conference participant was present during the conference (e.g., by visually presenting an icon for each participant with a visual indicator such as a check mark for each participant who was present, by visually presenting a list of participants who were present and a list of participants who were not present, or by indicating presence and/or absence of conference participants in any other suitable manner).

Although FIG. 20 depicts participant feedback pertaining to all conference participants, alternately or additionally, participant feedback may be specific to one conference participant, e.g., a sentiment analysis word cloud showing only the sentiment words uttered by the conference participant.

Although not depicted in FIG. 20, participant feedback may further include advice based on analysis of sentiment and/or non-verbal cues recognized by computerized intelligent assistant 1300. For example, if Anna frequently interrupted Beatrice, such advice may direct Anna to be careful about interrupting others, along with an indication of times in the transcript where Anna interrupted Beatrice. Accordingly, Anna may be able to review the transcript to become more cognizant about when she may be interrupting others. Participant feedback may further include exemplary interactions where an utterance provoked a specific reaction, e.g., if Carol said something that caused Dan to express negative sentiment, participant feedback given to Carol may indicate what she said to cause Dan to express the negative sentiment. Similarly, feedback may indicate exemplary interactions that led to various other sentiments, as well as non-verbal cues like raised voices, interruptions, pauses/silences, and conference participants departing the conference. In some examples, such exemplary interactions may be useable by computerized intelligent assistant 1300 to identify causes of conflict during the conference, and/or to identify portions of the conference that went particularly well.

Participant feedback may also include feedback regarding the timing and/or logistics of the conference. For example, such feedback could include calling attention to whether the conference started and/or ended on schedule, along with an indication of which conference participants showed up early, showed up late, and/or left early.

Participant feedback may be generated for each individual conference participant and/or for participants of a particular conference. Alternately or additionally, participant feedback may be aggregated for all conferences held by an organization and/or a team within an organization. For example, such participant feedback may provide cumulative statistics regarding individual participant and/or organizational behaviors, e.g., by measuring a percentage of meetings that start on time, a percentage of meeting participants who remained silent throughout a whole meeting, or any other suitable statistics and/or analysis of details captured in transcripts.

In some examples, computerized intelligent assistant 1300 may include a participant feedback machine configured to automatically analyze the transcript in order to communicatively couple to a companion device of a conference participant, and based on the analysis of the transcript, provide feedback regarding the conference to the conference participant (e.g., participant feedback 2000). In some examples, the feedback regarding the conference includes one or more of a notification message sent to the companion device and a reviewable transcript displayable at the companion device (e.g., reviewable transcript entries 181 as shown in FIGS. 13 and 1519).

Figure 21:
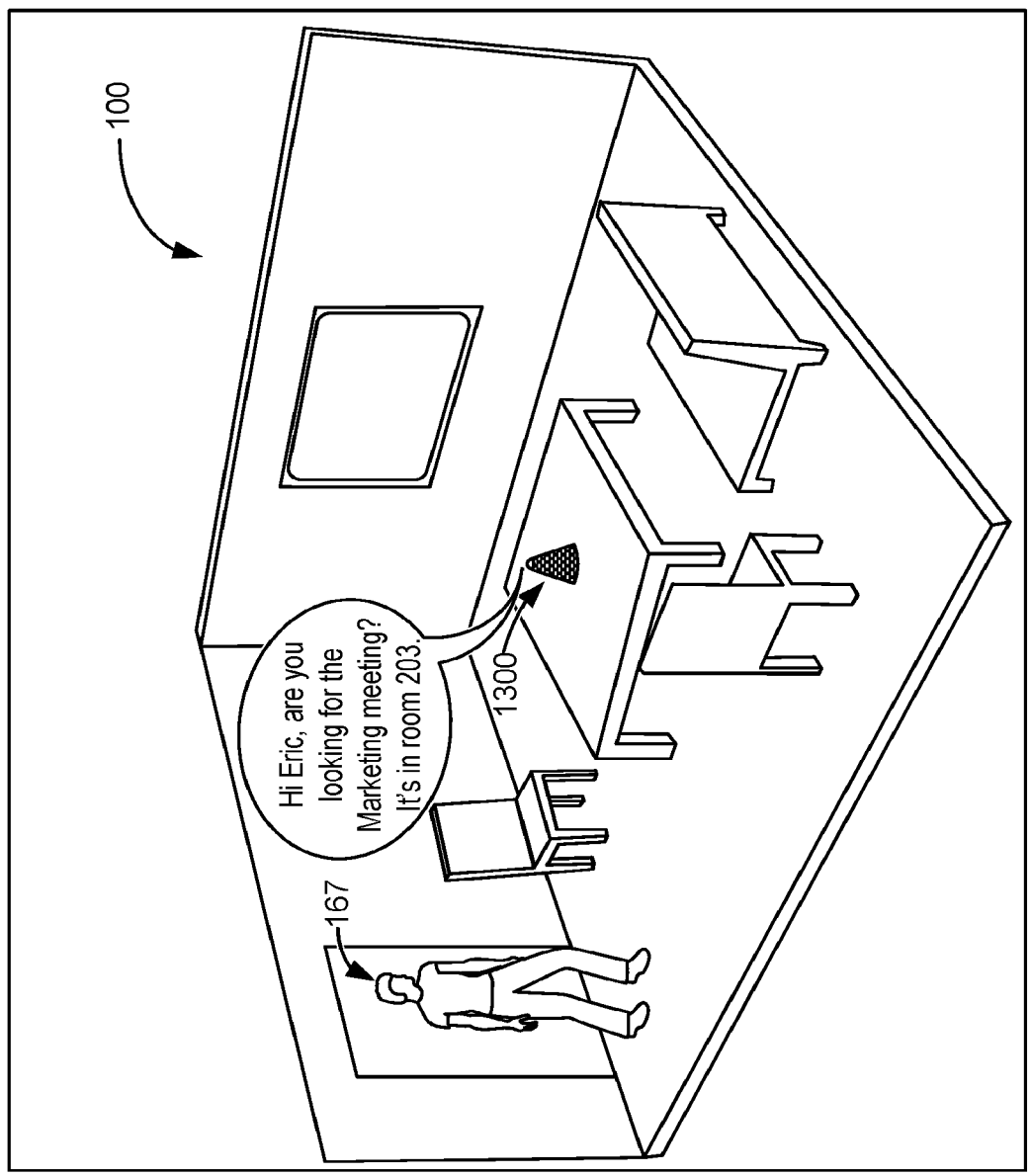
FIG. 21 shows an example use case in which a computerized intelligent assistant helps a user to find a conference room.

Computerized intelligent assistant 1300 may assist users in a conference environment even when no conference is scheduled or in progress in the conference environment. For example, computerized intelligent assistant 1300 may be aware of other scheduled conferences (e.g., in different conference environments or at a different time in the same conference environment). Computerized intelligent assistant 1300 may cooperate with backend server 1320 and/or with other, different computerized intelligent assistants to maintain a shared schedule and/or location mapping (e.g., floor map) of conferences within an organization or across multiple organizations. For example, FIG. 21 depicts the conference environment 100 shown in FIGS. 13 and 15-19, at a later time when no conference is being held. An individual 167 (Eric) shows up at conference environment 100 to find an empty conference room. Accordingly, computerized intelligent assistant 1300 may output speech audio, informing the individual 167 (Eric) that his meeting is in a different room. In some examples, computerized intelligent assistant 1300 may use a location mapping to give detailed directions (e.g., conference room is upstairs and to the left). In some examples, computerized intelligent assistant 1300 may recognize that an individual has arrived substantially early for (e.g., an hour early, or the day before) a conference and inform them when the conference will occur. In some examples, computerized intelligent assistant 1300 may recognize that an individual has missed a meeting, and accordingly may inform the individual when the meeting occurred, and/or provide a reviewable transcript of the meeting.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

FIG. 22 schematically shows a simplified representation of a computing system 1300 configured to provide any to all of the compute functionality described herein. Computing system 1300 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 1300 may be a computerized intelligent assistant 1300.

Computing system 1300 includes a logic subsystem 1002 and a storage subsystem 1004. Computing system 1300 further includes a camera 1012 and a microphone 1014. Computing system 1300 may optionally include a display subsystem 1008, input/output subsystem 1010, communication subsystem 1012, and/or other subsystems not shown in FIG. 22.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. For example, logic subsystem 1002 and storage subsystem 1004 of computing system 1300 are configured to instantiate a face identification machine 1020, a speech recognition machine 1022, an attribution machine 1024, a transcription machine 1026, and a gesture recognition machine 1028. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service). The software and/or other instructions that give a particular machine its functionality may optionally be saved as an unexecuted module on a suitable storage device.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., Markov models, conditional random fields, and/or AI knowledge bases), and/or natural language processing techniques (e.g., tokenization, stemming, constituency and/or dependency parsing, and/or intent recognition).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1008 may be used to present a visual representation of data held by storage subsystem 1004. This visual representation may take the form of a graphical user interface (GUI). Display subsystem 1008 may include one or more display devices utilizing virtually any type of technology. In some implementations, display subsystem may include one or more virtual-, augmented-, or mixed reality displays.

When included, input subsystem 1010 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones (e.g., a microphone, stereo microphone, position-sensitive microphone and/or microphone array) for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1012 may be configured to communicatively couple computing system 1300 with one or more other computing devices. Communication subsystem 1012 may include wired and/or wireless communication devices compatible with one or more different communication protocols. The communication subsystem may be configured for communication via personal-, local- and/or wide-area networks.

In an example, a method for facilitating a remote conference comprises: receiving a digital video from a first remote computing device of a plurality of remote computing devices; receiving a first computer-readable audio signal from the first remote computing device; receiving a second computer-readable audio signal from the second remote computing device; operating a face identification machine to recognize a face of a first remote conference participant in the digital video; operating a speech recognition machine to 1) translate the first computer-readable audio signal to a first text, and 2) translate the second computer-readable audio signal to a second text; operating an attribution machine configured to 1) attribute the first text to the first remote conference participant recognized by the face identification machine, and 2) attribute the second text to a second remote conference participant; and operating a transcription machine configured to automatically create a transcript of the conference, the transcript including 1) the first text attributed to the first remote conference participant, and 2) the second text attributed to the second remote conference participant. In this example or any other example, the face identification machine is further configured to recognize, for each remote conference participant of a plurality of remote conference participants in the digital video, a face of the remote conference participant; the attribution machine is further configured, for each remote conference participant of the plurality of remote conference participants, to attribute a portion of the first text to the remote conference participant; and the transcript includes, for each remote conference participant of the plurality of remote conference participants, the portion of the text attributed to the remote conference participant. In this example or any other example, the transcript further includes an arrival time indicating a time of arrival of the first remote conference participant and a departure time indicating a time of departure of the first remote conference participant. In this example or any other example, the arrival time is determined based on a time of recognition of the first remote conference participant by the face identification machine. In this example or any other example, the transcription machine is configured to: recognize content of interest for the first remote conference participant; automatically recognize the content of interest in the transcript; and include within the transcript an indication of a portion of the transcript related to the content of interest. In this example or any other example, the transcription machine is configured, responsive to recognizing the content of interest in the transcript, to send a notification to a companion device of the first remote conference participant including the indication of the portion of the transcript related to the content of interest. In this example or any other example, the transcription machine is further configured to receive, from a companion device of the first remote conference participant, an indication of a digital file to be shared with the second remote conference participant, wherein the transcript further includes an indication that the digital file was shared. In this example or any other example, the transcription machine is further configured to recognize a portion of the digital file being accessed by one or more of the first remote conference participant and the second remote conference participant, and wherein the transcript further includes an indication of the portion of the digital file that was accessed and a time at which the portion of the file was accessed. In this example or any other example, the transcription machine is further configured to recognize, in the digital video, visual information being shared by the first remote conference participant, and wherein the transcript further includes a digital image representing the visual information. In this example or any other example, the transcription machine is further configured to recognize a change to the visual information, and the transcript further includes a difference image showing the change to the visual information and an indication of a time at which the visual information was changed. In this example or any other example, the transcription machine is further configured to recognize an occlusion of the visual information and to process one or more difference images to create a processed image showing the visual information with the occlusion removed; and wherein the transcript further includes the processed image. In this example or any other example, the method further comprises visually presenting a reviewable transcript at a companion device of a remote conference participant, wherein the reviewable transcript includes the difference image showing the change to the visual information and wherein the reviewable transcript is configured, responsive to selection of the difference image, to navigate to a portion of the transcript corresponding to the time at which the visual information was changed. In this example or any other example, the transcription machine is configured to transcribe speech of a first conference participant in real time, the method further comprising presenting a notification at a companion device of a second conference participant that the first conference participant is currently speaking and including transcribed speech of the first conference participant. In this example or any other example, the transcription machine is further configured to analyze the transcript to detect words having a predefined sentiment, the method further comprising presenting a sentiment analysis summary at a companion device of a conference participant, the sentiment analysis summary indicating a frequency of utterance of words having the predefined sentiment. In this example or any other example, the method further comprises a gesture recognition machine configured to recognize a gesture by the first remote conference participant indicating an event of interest, and wherein the transcription machine is configured to include an indication that the event of interest occurred responsive to detection of the gesture by the gesture recognition machine.

In an example, a method for facilitating participation in a conference by a client device, comprises: receiving a digital video captured by a camera; receiving a computer-readable audio signal captured by a microphone; operating a face identification machine to recognize a face of a local conference participant in the digital video; operating a speech recognition machine to translate the computer-readable audio signal to text; operating an attribution machine to attribute the text to the local conference participant recognized by the face identification machine; sending, to a conference server device, the text attributed to the local conference participant; receiving, from the conference server device, a running transcript of the conference including the text attributed to the local conference participant, and further including different text attributed to a remote conference participant; and displaying, in real time, new text added to the running transcript and attribution for the new text.

In an example, a computerized conference assistant comprises: a camera configured to convert light of one or more electromagnetic bands into digital video; a face identification machine configured to 1) recognize a first face of a first local conference participant in the digital video, and 2) recognize a second face of a second local conference participant in the digital video; a microphone array configured to convert sound into a computer-readable audio signal; a speech recognition machine configured to translate the computer-readable audio signal to text; an attribution machine configured to 1) attribute a first portion of the text to the first local conference participant recognized by the face identification machine, and 2) attribute a second portion of the text to the second local conference participant recognized by the face identification machine; and a transcription machine configured to automatically create a transcript of the conference, the transcript including 1) the first text attributed to the first local conference participant, and 2) the second text attributed to the second local conference participant. In this example or any other example, the computerized conference assistant further comprises a communication subsystem configured to receive a second text attributed to a remote conference participant, wherein the transcription machine is configured to add, to the transcript, the second text attributed to the remote conference participant. In this example or any other example, the transcription machine is further configured to recognize, in the digital video, visual information being shared by a local conference participant, and wherein the transcript further includes a digital image representing the visual information. In this example or any other example, the computerized conference assistant further comprises a gesture recognition machine configured to recognize a hand gesture by a local conference participant requesting that recording be stopped, wherein the transcription machine is configured to stop creating the transcript responsive to recognition of the hand gesture by the gesture recognition machine.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At least one computer-storage device embodying computer-usable instructions which, when executed by at least one processor, implement a method for providing computer assistance to participants of a conference, the method comprising:
   receiving audio of the participants;
   identifying the participants;
   translating the audio into text;
   generating a transcript of the conference;
   tracking at least one of an arrival or a departure of a first participant during the conference;
   generating a tailored transcript for the first participant based at least on the transcript of the conference and further selectively based on either the arrival or the departure of the first participant; and
   providing the tailored transcript to the first participant via at least one of a display, an audio output, an email, a link, a text message, a chat message, an electronic message, or a notification message.

2. The at least one computer-storage device of claim 1, the method further comprising attributing portions of the text to one or more participants.

3. The at least one computer-storage device of claim 2, the transcript generated based at least in part on the attribution of portions of the text to the one or more participants.

4. The at least one computer-storage device of claim 1, the participants comprising local participants and/or remote participants.

5. The at least one computer-storage device of claim 1, wherein the participants are identified based at least in part on the audio.

6. The at least one computer-storage device of claim 1, comprising receiving video of the participants, wherein the participants are identified based at least in part on the audio and/or the video.

7. The at least one computer-storage device of claim 1, wherein generating the tailored transcript comprises determining a time period during the conference when the first participant was absent, based at least in part on the arrival or the departure of the first participant, the tailored transcript comprising:
   a filtered portion of the transcript, a summarized portion of the transcript, or a contextualized portion of the transcript; or
   the transcript comprising an indication of a portion of the transcript that corresponds to the time period during the conference when the first participant was absent.

8. The at least one computer-storage device of claim 6, wherein tracking at least one of the arrival or the departure of the first participant comprises determining an availability of the first participant to participate in the conference, the availability determined based on at least one of determining whether the first participant is logged in to the conference, determining whether the first participant is detectable in the audio, determining whether the first participant is detectable in the video, determining a physical location of the first participant, or detecting an audiovisual cue indicating that the first participant left the conference.

9. A computerized conference assistant for providing assistance to participants of a conference, the computerized conference assistant comprising:
   at least one processor;
   at least one storage device storing computer-usable instructions which, when executed by the at least one processor, implement operations comprising:
   receive audio of the participants;
   identify the participants;
   translate the audio into text;
   generate a transcript of the conference;
   track at least one of an arrival or a departure of a first participant during the conference;
   generate a tailored transcript for the first participant based at least on the transcript of the conference and further selectively based on either the arrival or the departure of the first participant; and
   providing the tailored transcript to the first participant via at least one of a display, an audio output, an email, a link, a text message, a chat message, an electronic message, or a notification message.

10. The computerized conference assistant of claim 9, the operations further comprising attributing portions of the text to one or more participants, the transcript generated based at least in part on the attribution of portions of the text to the one or more participants.

11. The computerized conference assistant of claim 9, wherein the participants are identified based at least in part on the audio.

12. The computerized conference assistant of claim 9, the operations further comprising:
   receive video of the participants; and
   identify the participants based at least in part on the audio and/or the video.

13. The computerized conference assistant of claim 9, wherein the tailored transcript is modified at least in part based on a time period during the conference when the first participant was absent, the time period based at least in part on the arrival or the departure of the first participant.

14. The computerized conference assistant of claim 13, the operations further comprising:
   determining one or more times in the transcript comprising content that is of interest to the first participant;

wherein the tailored transcript comprises:
- a filtered portion of the transcript, a summarized portion of the transcript, or a contextualized portion of the transcript, associated with the determined one or more times in the transcript; or
- the transcript and an indication of a portion of the transcript that corresponds to the time period during the conference when the first participant was absent.

15. The computerized conference assistant of claim 12, wherein track at least one of the arrival or the departure of the first participant comprises determine whether the first participant is logged in to the conference, determine whether the first participant is detectable in the audio, determine whether the first participant is detectable in the video, determine a physical location of the first participant, or detect an audiovisual cue indicating that the first participant left the conference.

16. A method for providing computer assistance to participants of a conference, comprising:
- receiving audio of the participants;
- identifying the participants;
- generating a record of the conference;
- attributing portions of the record to one or more participants;
- tracking at least one of an arrival or a departure of a first participant during the conference;
- generating a tailored record of the conference for the first participant based at least on the record of the conference and further selectively based on either the arrival or the departure of the first participant; and
- providing the tailored record of the conference to the first participant via at least one of a display, an audio output, an email, a link, a text message, a chat message, an electronic message, or a notification message.

17. The method of claim 16, the tailored record of the conference comprising audio, video, and/or text translated from the audio.

18. The method of claim 16, wherein the participants are identified based at least in part on the audio and/or a received video of the conference.

19. The method of claim 16, wherein the tailored record of the conference focuses on a time period during the conference when the first participant was absent, based at least in part on the arrival or the departure of the first participant.

20. The method of claim 19, wherein the tailored record of the conference comprises a portion of the record of the conference, a summarized portion of the record of the conference, or a contextualized portion of the record of the conference, based at least in part on an attribution of a portion of the audio to the first participant.

* * * * *